(12) United States Patent
Isukapalli et al.

(10) Patent No.: US 7,126,957 B1
(45) Date of Patent: Oct. 24, 2006

(54) MEDIA FLOW METHOD FOR TRANSFERRING REAL-TIME DATA BETWEEN ASYNCHRONOUS AND SYNCHRONOUS NETWORKS

(75) Inventors: Sridhar G. Sharma Isukapalli, Fremont, CA (US); Pradeep Pandey, San Jose, CA (US); Matthew D. Shaver, Fremont, CA (US); Neal A. Schneider, Palo Alto, CA (US); Gary Tsztoo, Saratoga, CA (US)

(73) Assignee: UTStarcom, Inc., Alameda, CA (US)

( * ) Notice: Subject to any disclaimer, the term of this patent is extended or adjusted under 35 U.S.C. 154(b) by 862 days.

(21) Appl. No.: 10/094,232

(22) Filed: Mar. 7, 2002

(51) Int. Cl.
*H04L 12/56* (2006.01)
*H04J 3/06* (2006.01)

(52) U.S. Cl. ............. 370/412; 370/429; 370/516; 375/371; 711/200

(58) Field of Classification Search ........... 370/415, 370/416, 395.61, 418
See application file for complete search history.

(56) References Cited

U.S. PATENT DOCUMENTS

| | | | |
|---|---|---|---|
| 4,156,112 A | 5/1979 | Moreland | |
| 4,534,024 A | 8/1985 | Maxemchuk et al. | |
| 4,771,425 A | 9/1988 | Baran et al. | |
| 5,345,445 A | 9/1994 | Hiller et al. | |
| 5,477,541 A | 12/1995 | White et al. | |
| 5,526,353 A | 6/1996 | Henley et al. | |
| 5,566,170 A | 10/1996 | Bakke et al. | |
| 5,684,954 A | 11/1997 | Kaiserswerth et al. | |
| 5,790,538 A | 8/1998 | Sugar | |
| 5,793,978 A | 8/1998 | Fowler | |
| 5,867,677 A | 2/1999 | Tsukamoto | |
| 6,157,653 A | 12/2000 | Kline et al. | |
| 6,208,662 B1 | 3/2001 | O'Neill et al. | |
| 6,215,685 B1 | 4/2001 | Fung et al. | |
| 6,243,667 B1 | 6/2001 | Kerr et al. | |
| 6,311,212 B1 | 10/2001 | Chong et al. | |
| 6,343,072 B1 | 1/2002 | Bechtolsheim et al. | |
| 6,434,606 B1 * | 8/2002 | Borella et al. | 709/214 |
| 6,665,317 B1 * | 12/2003 | Scott | 370/516 |
| 2001/0030966 A1 | 10/2001 | Choi | |
| 2002/0038379 A1 | 3/2002 | Sato et al. | |
| 2003/0112758 A1 * | 6/2003 | Pang et al. | 370/235 |
| 2003/0152094 A1 * | 8/2003 | Colavito et al. | 370/412 |
| 2005/0002409 A1 * | 1/2005 | Lai et al. | 370/412 |
| 2005/0007989 A1 * | 1/2005 | Wittmann | 370/349 |

\* cited by examiner

*Primary Examiner*—Hassan Kizou
*Assistant Examiner*—Brian Roberts
(74) *Attorney, Agent, or Firm*—Felix L. Fischer

(57) ABSTRACT

A system for transmitting real-time data between an asynchronous network (104) and a synchronous network (106) is disclosed. A method (100) may include an ingress path (102) for transmitting data from an asynchronous system (104) to a synchronous system (106), and an egress path (108) for transmitting data from a synchronous system (106) to an asynchronous system (104). An ingress path (102) may include a packet receiver (110) and write to synchronous system (112) steps. An egress path (108) may include read from synchronous system (114), packetizer (116), and packet transmitter (118) steps.

25 Claims, 16 Drawing Sheets

INGRESS PATH

Function Packet Receiver (upon receiving packet)
    get time indication value and number of channels from packet
        for each channel
            if channel is active
                calculate jitter buffer address from jitter buffer size, channel value, time indication
                copy payload to jitter buffer address
            else
                delete data for channel
        next channel

Function Write to Synchronous System (periodically invoked)
    generate jitter buffer address for first channel from jitter buffer base address and time indication
        for channel {
            read valid data from valid memory
            if valid bits set
                write jitter buffer data to local buffer according to channel id
            else
                write replacement data to local buffer according to channel id
    generate address for next channel (jitter buffer address + jitter buffer size)

FIG. 2

EGRESS PATH 400

Function Read from Synchronous System (invoked periodically) 402
    get time indication
    generate packet buffer offset from time indication
    generate first packet buffer address from buffer base address and offset
    for each channel
        write data from synchronous buffer to packet buffer
    next channel (add buffer size to packet buffer address)

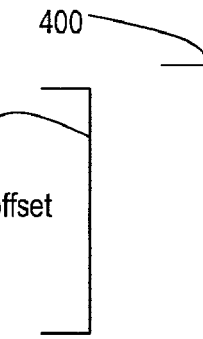

Function Packetizer (invoked periodically) 404
    get pointer to bin table
    loop through all bins on bin table
        check if bin ready to go
            for each ready bin
                get data for bin
                loop through channel list (for channels of bin)
                for all channels that are active and non-silent
                      create descriptor list channels in bin
                calculate packet parameters (e.g., length, channel count, checksums)
                add bin descriptor to transmit queue
            next ready bin

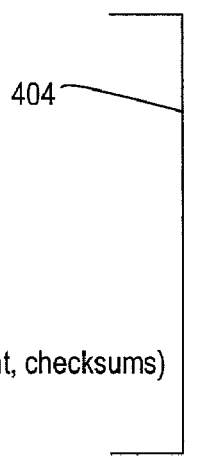

Function Transmit Packet (invoked by interrupt(s)) 406
    check transmit queue for data
    if transmit queue indicates data ready
        transmit data from transmit queue STOP DMA
        give DMA transmit head (first descriptor)
        START DMA
    if some packets are ready for next time
        queue up for transmit in transmit queue
            else
        no more packets to send – set transmit queue head to null value

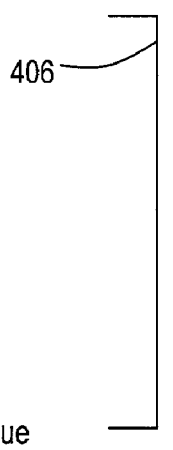

FIG. 4

INGRESS PATH
    Function Packet Receiver (upon packet reception)
        read UDP destination port, sequence #, timestamp — 602 if UDP destination port does not indicate multiplex (MUX) packet — 606
            get packet length
            calculate payload size (packet length − header − RTP header)
            extract channel value (CH)

if channel not valid
                drop packet
            else
            if payload type not valid    610
                drop packet
            else update monitoring info
            increment # of packets received, # of octets received, sequence # — 612 calculate jitter buffer (JB) offset
            JB offset = JB base add + (CH * (bytes of JB size)>>2)   614
        calculate jitter buffer index (jbi) from timestamp if first packet in stream
            save sequence #, timestamp difference
        else                                       616
            check for sequence # wrap
            check for timestamp value wraps
            set jb pointer to appropriate jb entry for each dword of payload    618
            copy dword to jitter buffer address (JB offset + jbi)

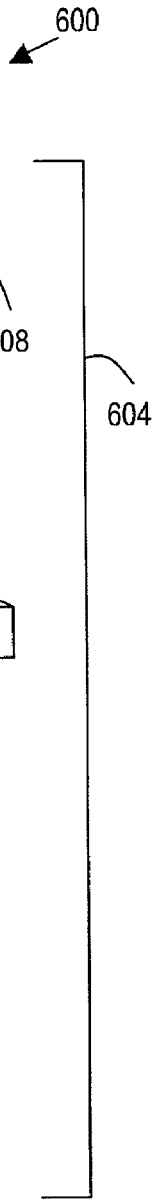

FIG. 6A

EGRESS PATH

TDM Read (every 500 us)   1002
    get timestamp
    generate packet buffer offset from timestamp
    for each channel
        generate address from packet base address, buffer size, and offset
        write data from TDM buffer to packet buffer

Function Packetizer (every 1000 us)
    get timestamp value for header
    get pointer to bin table   1004
    loop through all bins on bin table
        if bin count is zero
            get sample size for channels belonging to bin (from bin table)
            get number of channels in bin (from bin table)
            get pointers to header buffers (from bin table)
            loop through channel list (for channels of bin)
                check for channels that are active and non-silent
                create descriptor list for all channels
            calculate parameters based on data in packet
                calculate total length, UDP length
                update channel count
            calculate UDP checksum
            update length, checksum value in headers
        append bin descriptor to transmit queue
    next bin

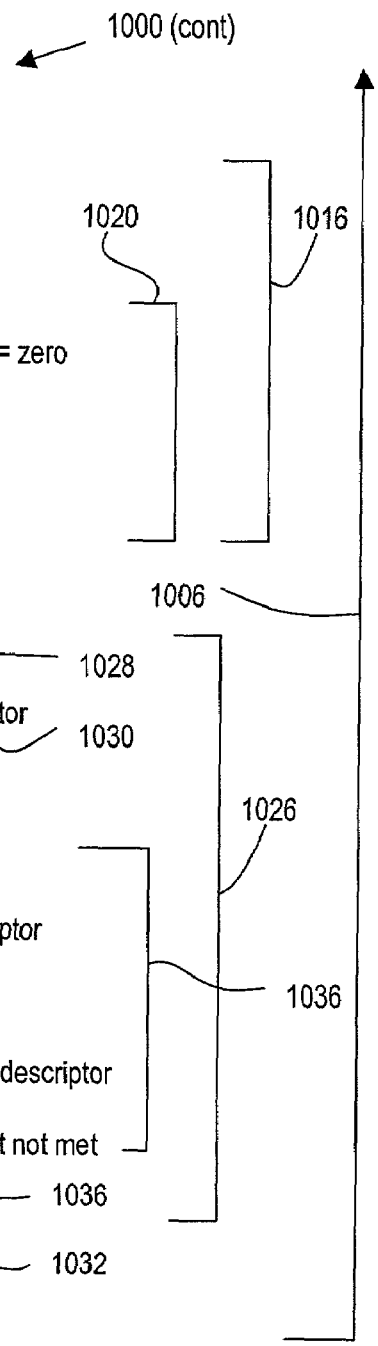

```
function find queue index (returns queue index)
    queue index = last queue index
    if queue index = max queue index          1018
        queue index = 0
    do while queue index NOT= last queue index
        increment queue index and LP packet pointer NOT= zero
        if queue index = LP queue index
            return queue index
        else if queue head NOT= queue tail
            return queue index
    return max queue index (no packets found)        1022 function chain (returns chain head value)
    if queue index is LP packet                1028
        chain_head = chain_tail = pointer to LP descriptor
                                                1030
    else (chain up descriptors)
        get pointer to descriptor from queue index
        do
            if first descriptor
                chain_head = ptr to packet head descriptor
                chain_tail = ptr to packet tail descriptor
            else (not first packet)
                set chaining bit in descriptor
                chain_tail -> buffer 2 ptr = packet head descriptor
                chain_tail = packet head descriptor
        while transmit chain limit not met and buffer limit not met
        set "last" descriptor bit in descriptor
                                                1036
    return pointer to chain_head
                                                1032
```

FIG. 10C

MEDIA FLOW METHOD FOR TRANSFERRING REAL-TIME DATA BETWEEN ASYNCHRONOUS AND SYNCHRONOUS NETWORKS

TECHNICAL FIELD

The present invention relates generally to systems for processing data transmitted over networks, and more particularly to systems in which data is transferred between an asynchronous system and a synchronous system.

BACKGROUND OF THE INVENTION

Data communication networks may be generalized into at least two types: asynchronous and synchronous. Performance characteristics and transmission latencies in synchronous networks are understood, and in many cases predictable. However, many asynchronous networks can be easier and less expensive to deploy and maintain than typical synchronous networks. In light of the convergence of disparate networks, there arises a need to provide methods and systems for interconnecting asynchronous networks with synchronous networks. Asynchronous networks typically operate under well known protocols, including by not limited to, the Transmission Control Protocol (TCP), Internet Protocol (IP), User Datagram Protocol (UDP) to name but a few. A well known synchronous network approach includes time division multiplexing (TDM), which can allocate particular data channels to predetermined time slots.

One very particular application for interconnecting asynchronous and synchronous systems is the transmission of "real-time" traffic, for example voice data. Conventional voice data examples will now be described.

Conventionally, voice data remains separate from network data traffic. In particular, many enterprises may have a data network connecting a variety of workstations as well as a public branch exchange (PBX) for voice data. As data networks proliferate, it is becoming an increasingly desirable goal to integrate transmission of voice and data onto a converged network "backbone."

Transmitting data over a synchronous network, such as a time division multiplex (TDM) voice system, typically includes framing data. Frames are allocated portions of bandwidth, usually formed according to a time division multiplexing scheme. TDM arrangements may be less flexible than asynchronous approaches because time slots are allocated to particular streams. Thus once a time slot is allocated, it may not be used for another data stream until it has be re-allocated.

Another way to provide real time data can be transmitting such data over an asynchronous network. For example, voice data may be transmitted with a "voice over packet" system Voice over packet can take advantage of existing network structures. Further, as noted above, networks (including the Internet) continue to grow in size and in bandwidth, reducing the cost and/or increasing the feasibility of such systems.

Many networks can be "connectionless" networks. Connectionless networks can provide multiple possible paths between source and destination. Consequently, in some cases, voice transmitted over such networks may be more reliable as voice data can reach a destination even if some of the network nodes are not operational.

Data networks may take a variety of forms. As noted above, a data network may be a connectionless network, including the Internet. Further, a network may include portions that are overlaid and/or integrate connection-oriented legs. Such systems include Internet protocol (IP) over asynchronous transfer mode (ATM) and multiprotocol label switching (MPLS), or similar switching systems.

One possible drawback to transmitting voice data over connectionless networks, or networks having connectionless portions, can be the potential for different portions of the same voice stream arriving out of sequence. For example, a stream of voice data is typically broken down into samples and transmitted in a particular sequence over a network. However, while such samples can be transmitted in order, because packets may travel along different legs of a network, a sample may arrive out of order. Still further, it is possible for packets to be dropped. Thus, a voice sample may never arrive at a desired destination.

In voice over packet arrangements, voice data needs to be reassembled in the same order that it was transmitted with minimal latency. This can be difficult to achieve with many conventional approaches.

Various proposals for implementing voice over packet have been proposed. One general approach is the idea of a network "gateway." A network gateway can provide access to a network (such as the Internet) for a variety of conventional voice data sources (voice channels). As but one example, a network gateway can be an IP gateway that integrates a PBX with an IP network. In such an arrangement, users may make telephone calls that appear entirely conventional, but are in fact being transmitted over a data network.

One drawback associated with voice over packet can be the latency introduced by such approaches. Various sources may contribute to latency. A transmitting source introduces some delay in placing the voice into packet form. Typically the voice data can be digitized and/or compressed and then placed in packet form. Transmission of the voice over packet can also introduce latency. Routing from node to node, or along a switching path, can consume additional time. Finally, a receiving destination can introduce delay. Voice data can be extracted from a packet and then transmitted along an appropriate voice channel. Such packet processing can be conventionally accomplished on a channel-by-channel basis. That is, single packets may contain the voice data for a single voice channel.

According to one conventional approach, a network voice packet can be forwarded to a destination according to conventional protocols, such as the Real-time Transport Protocol (RTP). A destination can include conventional network hardware, such as a network interface card, which can receive the packet. A general purpose processor can then extract voice data within the packet (including any decoding/decompressing) and then play the voice data over sound card, or the like. Such computation steps can contribute significantly to latency.

According to another conventional approach, a network can include a network phone (such as an "IP Phone"). A network phone can have its own network address, and include packet processing and voice data processing hardware.

One conventional way to decrease latency is with more complex routers. In particular, some routers may be capable of giving particular packets precedence over others. As but one example, some packet headers can include a "type of service" or "quality of service" field. A network voice packet can be given higher precedence than other packets, thereby reducing latency when compared to other packets. A drawback to such approaches is that all routers/switches in the network must have such an advanced processing capability, and thus can be expensive to implement. Consequently, such an approach may be better suited for enterprise wide area networks (WANs), instead of a larger network structure such as the Internet.

Another approach can essentially reserve a route for a voice packet flow. One such approach is the Resource ReserVation Protocol (RSVP). RSVP, like the precedence approach noted above, can rely on more complex routers and thus be an expensive solution.

While the approaches described above can reduce latency for voice packet data, such approaches may be difficult and/or expensive to implement. Further, it is still desirable to reduce latency even more. Thus, further ways of decreasing latency in network voice packets could a valuable contribution to voice over packet.

While conventional packet forwarding of voice over a packet may provide adequate results, this may not always be the case. To help improve the processing of time dependent data, including voice data, a number of protocols have been proposed. One such protocol is the Real-Time Transport Protocol (RTP). An RTP header can provide sequence and timestamp information than may help assemble voice data once it has been received.

Another concern that may arise out of voice over packet is different possible voice data formats. Some formats may require different processing than others. Further, the processing of one voice format type may take longer and/or require more resources than other voice formats. For example, systems may have different vocoding techniques for digitizing speech for transmission in a packet, resulting in different size payloads representing speed samples.

Further, different packet formats may represent different numbers of data sources. As but two of the many possible examples, "multiplexed" packets, can contain data from multiple sources, while "simplex" packets, may contain voice data form a single source. With the advent of multiplexed and simplex packets, systems may have to be capable of accommodating both types of payloads.

Voice data can present a challenge to voice over packet systems. In particular, it can be a complex task to extract voice samples from a packet, and then arrangement such samples for playback. Multiplexed voice data may present a greater challenge in that multiple voice samples have to be extracted from a single packet payload.

Voice over packet systems are typically "asynchronous" in that voice data samples may arrive at varying time intervals and/or in varying order. This is in contrast to conventional "synchronous" voice systems, such as TDM systems, that reserve time slots for particular voice channels. An important issue arriving out of systems that seek to transfer voice data from an asynchronous system to a synchronous system can be variable network delay in voice data arriving from an asynchronous system (jitter).

Of course, it is understood that voice data represent but one of the many applications for interconnecting asynchronous and synchronous systems. A system for accounting for network jitter could have various other applications that transmit data from an asynchronous network to a synchronous network. Such alternative applications include, but are not limited to other non-voice data applications, including but not limited to video data and various other computing applications.

In light of the above, it would be desirable to arrive at a method that can receive data from an asynchronous network, and store such data for synchronous access by a synchronous network. Such a method could address various drawbacks to conventional approaches, and could be particularly valuable in voice over packet applications.

SUMMARY OF THE INVENTION

According to one embodiment of the present invention, a method for transmitting multiple channel data between a synchronous and an asynchronous system may include an ingress path and egress path. An ingress path may transmit data from an asynchronous system to a synchronous system and may include a packet receiving step and a write to synchronous step.

According to one embodiment, a packet receiving step may be initiated upon receipt of a data packet from an asynchronous system. A packet receiving step may include reading a time indication from a received packet, where a received packet may include samples for multiple channels. A status for each channel may be checked to see if a channel is active. If a channel is active, a jitter buffer address may be generated for the channel. Preferably, a jitter buffer address may be generated from a jitter buffer size value, the channel value, and the time indication. The data sample corresponding to the channel may then be written to the jitter buffer address.

A write to synchronous step may be initiated periodically. A write to synchronous step may read data samples from jitter buffer locations to at least one local buffer.

According to one aspect of the embodiments, a write to synchronous step may include generating a first local buffer address for a first channel, then generating subsequent local buffer addresses by incrementing a local buffer address by a buffer size value.

According to another aspect of the embodiments, a write to synchronous step may include writing data samples to one local buffer when a time indication has one value (e.g., is odd), and writing data samples to another local buffer when a time indication has another value (e.g., is even). That is, data samples may be "double buffered."

According to an embodiment of the present invention, an egress path may transmit data from a synchronous system to an asynchronous system and may include a read from synchronous step, a packetizing step, and a packet transmitting step. A read from synchronous step may include periodically generating packet buffer addresses for valid data samples, where each data sample corresponds to a particular time slot in the synchronous system. Such packet buffer addresses may be generated from a time indication and buffer size value.

In the case of multiplexed data samples, a packetizing step may include checking the status of each of a plurality of bins, where each bin includes a number of channel values. If a bin has a ready status, data samples corresponding to the bins may be organized into a sequential order.

A packet transmitting step may include reading data samples for the channel values of a bin according to the sequential order established in the packetizing step.

According to one aspect of the embodiments, generating packet buffer addresses may include generating a first packet buffer address, then generating subsequent packet buffer addresses by adding a buffer size to a previous packet buffer address.

According to another aspect of the embodiments, a packetizing step may include creating one or more descriptors, where each descriptor includes at least one pointer to a data sample of a channel. Descriptors may be chained together to thereby form pointers to a sequence of data samples.

BRIEF DESCRIPTION OF THE DRAWINGS

FIG. 2 shows an example of an ingress path according to a second embodiment.

FIG. 4 shows an example of an egress path according to a second embodiment.

FIGS. 6A to 6C show an example of an ingress path according to a third embodiment.

FIGS. 10A to 10C show an example of an egress path according to a third embodiment.

DETAILED DESCRIPTION OF THE EMBODIMENTS

Various embodiments of the present invention will now be described with reference to a number of drawings. The various embodiments may include methods for transferring data between a synchronous and an asynchronous network.

Figure 1:
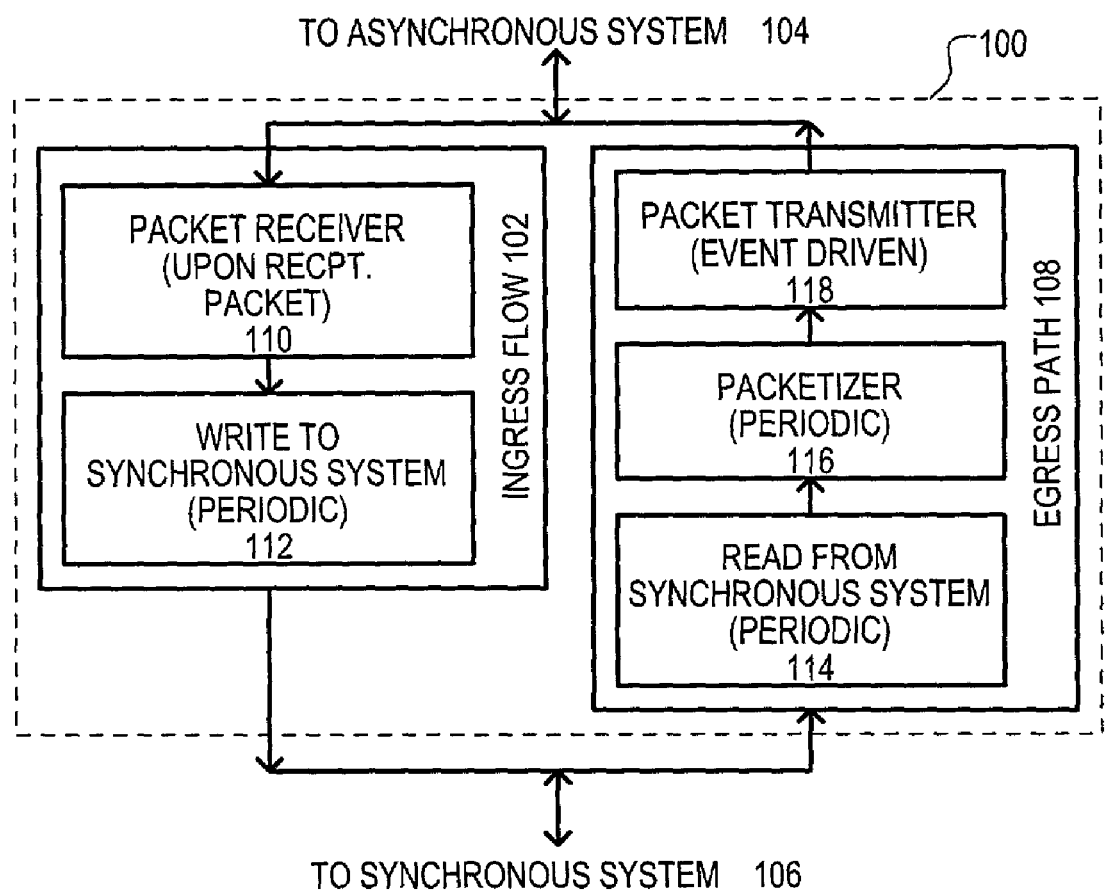
FIG. 1 is a block diagram of a first embodiment.

A method according to a first embodiment is set forth in FIG. 1, and designated by the general reference character 100. A method 100 may be represented by two "flows." An ingress flow 102 may represent the processing of data received from an asynchronous system 104 for a synchronous system 106. An egress flow 108 may represent the processing of data received from a synchronous system 106 to an asynchronous system 104.

An ingress flow 102 may include a packet receiver 110 that may be invoked upon reception of a new packet from an asynchronous system 104. Data contained within such packets may be organized by a packet receiver 110 to account for asynchronous transmission delays. In one particular arrangement, data may be stored in a "jitter" buffer to account for the asynchronous rate at which data can be received and/or unpredictable aspects of a network. For example, such a buffering can organize packets of a stream that are out of order, account for lost packets, or account for arrival time jitter (differences in transmission times between packets).

A write to synchronous system 112 may also be included in an ingress flow 102. A write to synchronous system 112 may be invoked periodically, and include writing data from predetermined locations accessible by a packet receiver 110 (e.g., a jitter buffer) to locations accessible by a synchronous system 106. In one particular arrangement, data may be written from a jitter buffer to a local buffer that includes locations that can correspond to particular time segments of a synchronous system 106. It is noted that the periodic invocation of a write to synchronous system 112 may serve to essentially convert asynchronously received data to data that may be read synchronously.

As but one even more particular example, data may be read from a jitter buffer at a rate equivalent to 64 kilobits per second. While data may be read at 1 data byte every 125 microseconds, for more efficient use of system bus bandwidths, such a read rate may be 4 bytes every 0.5 milliseconds, or 8 bytes every 1 ms, etc.

An egress flow 108 may be conceptualized as including a read from a synchronous system 114, a packetizer 116, and packet transmitter 118. A read from a synchronous system 114 may include periodically reading data from a local buffer that can include locations corresponding to particular time segments of a synchronous system 106. Further, data read from such a local buffer may be written to predetermined locations based on the corresponding time segment.

A packetizer 116 may periodically access a list that records possible outgoing data streams (e.g., voice channel). In one arrangement, a packetizer 116 may organize data for transmission according to predetermined conditions. Such conditions may include a "count" that indicates how long it has been since data for a given data stream has last been transmitted. Such data streams may be organized (e.g., by common destination) into groups, also referred to as "bins." A packetizer 116 may organize data for bins for a fast data move operation, such as a direct memory access (DMA) write.

A period at which a packetizer 116 accesses outgoing data streams may be synchronous with a destination synchronous system. For example, a destination system may be time division multiplex (TDM) system that includes a timestamp that periodically increments. A packetizer 116 may operate in synchronism with such a timestamp. A packet transmitter 118 may be invoked in response to system indications, such as one or more system interrupts. A packet transmitter 118 may examine "bin" data, as described above, and transmit such data according to predetermined conditions. Such conditions may include a bin "count" that indicates how long it has been since data for a bin has last been transmitted. In one particular approach, a packet transmitter 118 may be invoked by a transmitting process, such as a direct memory access (DMA) engine, whenever the transmitting process is ready to send data. In addition, if a transmitting process has no data to send, a packetizer may invoke the transmitting process once it has organized data for transmission.

Thus, according to a first embodiment, a method 100 may include separate ingress and egress paths, having particular components for transforming data between asynchronous formats and synchronous formats.

A second embodiment will now be described with reference to FIGS. 2, 3A and 3B, 4, and 5A and 5B. A pseudocode representation of an ingress path is set forth in FIG. 2, and designated by the general reference character 200. "Pseudocode," a broad way of expressing the various elements of a flow, may be implemented into particular computer language code versions for use in a system employing a general processor. In addition, the described method can be implemented in a higher-level hardware designing language, to enable the preferred embodiment to be realized as an integrated circuit (IC) or a portion of an IC. Pseudocode is widely used in industry and textbooks to express methods and devices, and would be understood by one skilled in the arts of computer systems and/or hardware designing arts.

FIG. 2 shows an ingress path 200 that may include a packet receiver function 202 and a write to synchronous system function 204. It is noted that a packet receiver function 202 may be invoked in response to the receipt of a new packet. A write to synchronous system function 204 may be invoked periodically.

Figure 3A:
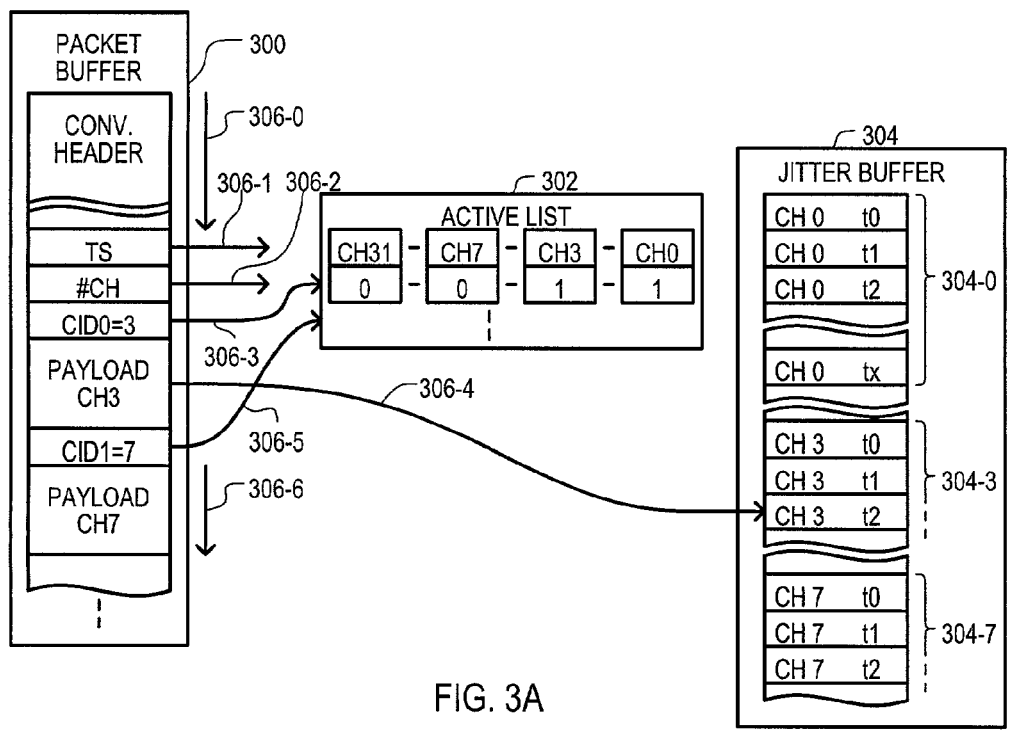
FIGS. 3A and 3B show examples of structures and steps of an ingress path according to a second embodiment.

Referring now to FIGS. 2 and 3A, one example of a packet receiver function 202 will now be described. FIG. 3A is a diagrammatic representation of various steps of a packet receiver function.

As shown in FIG. 2, a packet receiver function 202 may include getting a time indication and a number of channels for a packet 206. Different channels may represent different destinations for data. More particularly, different channels may represent different voice channels. A time indication may represent a time at which voice channels were sampled at a transmitting end.

A packet receiver function 202 may then write channel data for each channel in the packet according to whether or not the channel is active 206. An active channel is a channel that may be receiving or sending data. More particularly, an active channel may represent a particular voice data stream between two call locations. In the embodiment of FIG. 2, if a channel is active, payload data can be written to a jitter buffer. However, if a channel is not active, the data may be "deleted." Of course, deleted may simply mean bypassing addresses corresponding to data of an invalid channel.

Referring to FIG. 3A, various structures involved in a packet receiver function 206 are shown along with arrows that correspond to steps of FIG. 2. In particular, FIG. 3A shows a buffered packet 300, an active list 302, and a "jitter" buffer 304. A buffered packet 300 may be a packet stored in a memory such as a first-in-first-out buffer (FIFO), as but one example. An active list 302 may include one or more addresses that include an active indication for each channel. In the particular example of FIG. 3A, a status for channels 0 through 31 is represented by one bit. Of course, more than 32 channels may be represented, and more than one bit of status information may be assigned for each channel.

A jitter buffer 304 may include memory locations that represent multiple time samples for a give channel. A jitter buffer 304 may account for the asynchronous nature of incoming data, thereby allowing for a smoother playback of received data. In the particular example of FIG. 3A, a jitter buffer may include multiple locations for each channel, with each location corresponding to a particular sample time (shown as times t0 to tx). Jitter buffer locations for three channels are shown, channel 0 is shown as 304-0, channel 3 is shown as 304-3 and channel 7 is shown as 304-7.

Referring to FIG. 2 in combination with FIG. 3A, a step 206 may be represented by arrows 306-0 to 306-2. Arrow 306-0 represents how a predetermined number of buffered locations may be bypassed (stepped through) to arrive at one or more predetermined fields in a buffer header. Arrow 306-1 shows how a timestamp field (TS) may be accessed, and a timestamp value read. A timestamp value, or portion thereof, may be a time indication value for packet. Arrow 306-2 shows how a number of channels may be ascertained for a packet. A channel number field (#CH) may indicate how many channels are included in a packet.

In FIG. 3A, channel data may have a predetermined arrangement, and thereby accessible according to a number of channels. More particularly, channel data may be sequentially arranged in a packet, and include a channel identification (CID) and payload (e.g., sample). Payload data for each channel may be the same size. Payload data for two channels are shown, channel 3 (CID3: PAYLOAD CH3) and channel 7 (CID7: PAYLOAD CH7). In such an arrangement, channel data may begin at a predetermined location, and sequential channel data may be accessed by accessing a number of sequential locations in a buffered packet 300.

Steps 208 of FIG. 2 are represented in FIG. 3A by arrows 306-3 to 306-6. Arrow 306-3 represents how a channel may be checked to see if it is active. In particular, a channel ID field (CID0) may be read indicating channel 3 is a first stored channel. Such a channel value may then index to one or more bits in an active list 302. In the active list 302 example of FIG. 3A, a "1" indicates an active channel while a "0" indicates an inactive channel. Thus, channel 3 active data may be read with a CID0=3 value to indicate that channel 3 is active.

As shown in FIG. 2, if a channel is active, a jitter buffer address is calculated. A jitter buffer address may be calculated according to a jitter buffer size, channel value and time indication. A jitter buffer channel value and size may index to a particular jitter buffer location for a channel (e.g., 304-0, 304-3, 304-7.). A timestamp, or portion thereof, may index to a particular location for a channel. In the example of FIG. 3, a timestamp value corresponds to a time t2, thus a channel 3 payload may be written to the CH3 t2 location in region 304-3. Arrow 306-4 shows the copying of a payload to a jitter buffer address. Such a step may include copying data from a predetermined number of sequential locations until arriving at data for a next channel.

Arrow 306-5 shows how a next channel (in this case channel 7) may be checked to see if it is active. Such a step may be essentially the same as that for the previous channel. However, in the example of FIG. 3A, an active list 302 indicates that channel 7 is inactive (e.g., its bit is 0). Referring back to FIG. 2, if a channel is not active, any channel data for a packet may be "deleted." Arrow 306-6 is a representation of such a step. Such a step may include stepping through the data for an inactive channel to arrive at next channel data (e.g., "draining" channel data).

Referring back to FIG. 2, a write to synchronous system function 204 will now be described. Such a function 204 may include generating a jitter buffer address for a first channel from a base address and a timestamp value. Such a step may include accessing registers, or the like, that store such values.

A write to synchronous system function 204 may then write data for each channel to a local buffer. What type of data is written may depend upon valid data. Valid data may be read that corresponds to all entries of a jitter buffer location. Valid data may indicate if the corresponding data stored at a jitter buffer location is valid. If such data is valid, the jitter buffer data may be written to a corresponding local buffer location. However, if such data is not valid, replacement data may be written to the corresponding local buffer location. Once a write for a first channel is completed, the operation may be repeated for each of a number of channels.

Figure 3B:
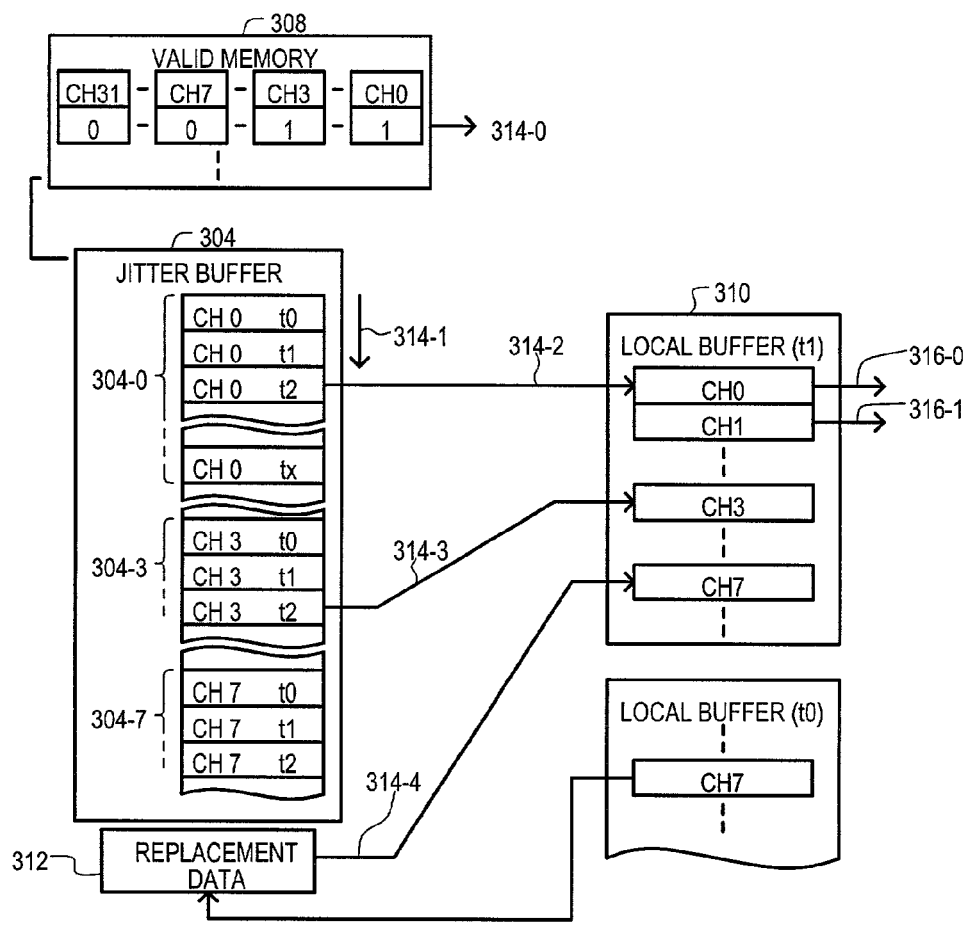

In one particular arrangement, valid data may include at least one or more jitter buffer state bits and one or more active bits. Jitter buffer state bits can indicate when a data for a given channel is valid. Active bits can indicate when a channel is actually in use. Thus, a valid bit need not be examined for an inactive channel. Referring to FIG. 3B, various structures involved in a write to synchronous system 204 are shown, along with arrows that correspond to steps of FIG. 2. In particular, FIG. 3B shows a jitter buffer 304, a valid memory 308, a local buffer 310, and replacement data generator 312. A jitter buffer 304 was previously described with reference to FIG. 3A. A valid memory 308 may include one or more bits of valid data for each entry of a jitter buffer 304. In the particular example of FIG. 3A, the validity for each channel can be represented by a one bit "1," while invalid data may be represented by a "0." Of course valid data for more than 32 channels may be represented, and more than one bit of valid information may be assigned for each channel.

A local buffer 310 may store data for all channels at a given sample time. Thus, data may be sequentially read from a local buffer 310 to yield synchronous data. Replacement data generator 312 may take a variety of forms. A replacement data generator 312 may be series of circuits and/or processor steps that generate data to replace missing or corrupted data for a channel. Replacement data may be generated according to any of a number of algorithms. FIG. 3B shows a case where a replacement data generator 312 may access previously buffered data for the channel to interpolate replacement data.

Various steps of a write to a synchronous system function 204 are represented by arrows 314-0 to 314-4. Arrow 314-0 represents how a valid data may be read from a valid memory 308. As but one example, valid data for multiple channels (e.g., 32) may be read from a single valid memory location. Once data have been for such channels (e.g., channels 0–31) a valid data for a next set of channels (e.g., 32–63) may be read.

Arrow 314-1 shows how a first channel address may be generated. In particular, a jitter buffer 304 may begin at a base address (entry for CH0 t0). A time indication, or portion thereof, may then be used as an offset to a base address to arrive at a first channel address. In this case, it is a location for CH0 t2 data.

Arrow 314-2 shows how a channel data for a given time period may be written to a corresponding location in a local buffer 310. It is noted that such data may be written because channel 0 valid data indicates the channel is valid.

As shown in FIG. 2, after data is written for a channel, an address for a next channel may be generated. In the case of FIGS. 2 and 3B, next channel address may be generated by adding a buffer size value to current jitter buffer address. In this way, a next jitter buffer address can index to a next channel location corresponding to the same sampling time as a previous channel. Accordingly, in FIG. 3B, an initial jitter buffer address can point to entry CH0 t2, a second jitter buffer address points to CH1 t2, etc.

Arrow 314-3 shows a reading of data for a fourth jitter buffer address that points to entry CH3 t2. From previously read valid memory data, it is known that channel 3 is valid. Consequently, data from entry CH3 t2 can be copied to a channel 3 location in a local buffer 310.

Arrow 314-4 illustrates an operation where data is written to a channel location, when a channel is not valid. As shown in FIG. 2, when a channel is not valid, data from replacement data generator 312 may be written to a local buffer. Valid data shown in FIG. 3B shows that channel 7 data is not valid (e.g., a "0"). Consequently, instead of writing data from a jitter buffer location, replacement data may be written to a channel 7 location in a local buffer 310.

Once data for all channels in local buffer 310 has been received, such data may be read from a TDM buffer. Such a reading is shown in FIG. 3B by arrows 316-0 and 316-1. Arrows 316-0 and 316-1 show the reading of data from channels 0 and 1. Data may thus be read in parallel from a local buffer 310. Such a reading of data may occur for each channel after predetermined time periods, thus yielding a synchronous stream of multiple channel data.

In this way an ingress path 200 may include a packet receiver function 202 that may get information for extracting payloads for multiple channels in a packet, where such a packet may be arriving from an asynchronous system. Such payload data may be written to jitter buffer locations according to a time indication value in a packet, thus accounting for differences in timing and/or order for a given channel. A write to synchronous system function 204 may then periodically write data in order to a local buffer coupled to a synchronous system, which may then read such data in a synchronous fashion.

A pseudocode representation of an egress path is set forth in FIG. 4, and designated by the general reference character 400. FIG. 4 shows an egress path 400 that may include a read from synchronous system function 402, a packetizer function 404, and a transmit packet function 406. It is noted that a read from synchronous system function 402 and a packetizer function 404 may be invoked periodically. However, a transmit packet function 406 may be invoked according to criteria that is not necessarily periodic (e.g., one or more system interrupts).

Figure 5A:
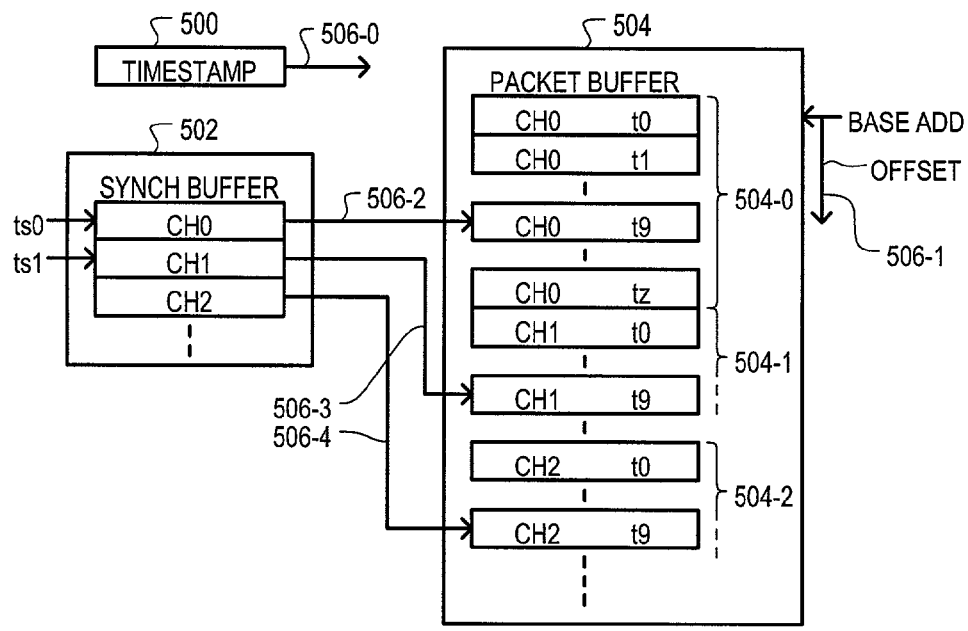
FIGS. 5A to 5C show examples of structures and steps of an egress path according to a second embodiment.

Referring now to FIGS. 4 and 5A, one example of a read from synchronous system function 402 will now be described. FIG. 5A is a diagrammatic representation of various steps of a read from synchronous system function 402.

As shown in FIG. 4, a read from synchronous system function 402 may include getting a time indication value. Such a time indication value may be a local time indication that is stored in a register or the like, and is periodically incremented. A time indication may designate a point of time at which voice data are sampled from a synchronous system. A function 402 may then continue by generating an offset value from a time indication. In a similar fashion to the ingress arrangements described above, data for a given channel may be stored in sequential locations in a memory (in this case a packet buffer). Sequential locations may indicate on-going periods of time (with wrapping in the case of "circular" buffer arrangements).

Having generated an offset value from a time indication, a function 402 may then generate a first packet buffer address. For each channel, data may be written from a synchronous buffer to a packet buffer.

Referring to FIG. 5A, various structures involved in a read from synchronous system function 402 are shown, along with arrows that correspond to steps of FIG. 4. In particular, FIG. 5A shows a timestamp register 500, a synchronous buffer 502, and a packet buffer 504. A timestamp register 500 may store a timestamp value that is periodically incremented.

A synchronous buffer 502 may include storage locations for a number of channels. It is understood that each storage location may correspond to a particular time slot in a synchronous system. Thus, an arrow ts0 shows that data in a given time slot may be written to a CH0 location, while an arrow ts1, shows that data for a subsequent time slot may be written to a CH1 location. In this way, synchronous multiple channel data may be buffered.

A packet buffer 504 may include storage locations for multiple channels. Each storage location may include data corresponding to a particular time period. Thus, storage locations for channel 0 are shown collectively as 504-0, storage locations for channel 1 are shown collectively as 504-1, and storage locations for channel 2 are shown collectively as 504-2. Three of many possible time periods for channels are shown, t0, t1 and t9.

An arrow 506-0 shows how a time indication may be read from a timestamp register 500. As noted above, such a value may then be used to generate an offset value. As but one of the many possible examples, a binary timestamp value may be shifted, and resulting portions used as an address offset value. Once an offset value has been generated, a packet buffer address for a first channel may be generated.

Arrow 506-1 shows the generation of a packet buffer address by adding an offset value (OFFSET) to a base address. In the particular example of FIG. 5A, an offset value indexes to a CH0 t9 location.

Arrow 506-2 shows the writing of channel 0 data to a location CH0 t9 in a packet buffer 504.

As noted in FIG. 4, once channel data for a first channel has been written, data for a next channel may be written. Such a step may include adding a packet buffer size value to a packet buffer address. Arrows 506-3 and 506-4 show writes for the next two channels (channels 1 and channels 2). It is noted that such writes occur to packet buffer locations of the corresponding time period as the first write (e.g., t9).

Figure 5B:
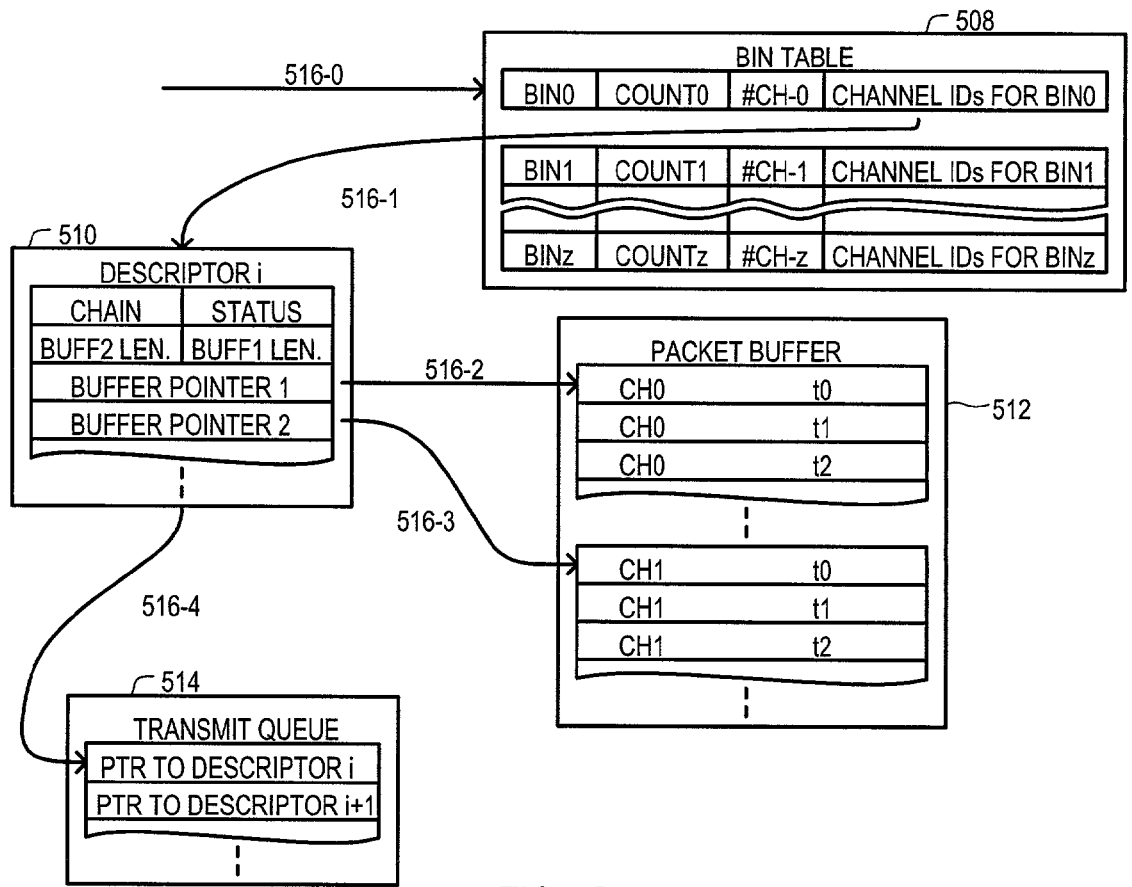

Referring now to FIGS. 4 and 5B, one example of a packetizer function 404 will now be described. FIG. 5B is a diagrammatic representation of various steps of a packetizer function 404.

As shown in FIG. 4, a packetizer function 404 may include getting a pointer to a "bin" table. A bin table may be a list of bins, each of which may correspond to a payload that is to be transmitted. A packetizer function may then loop through all bins of a bin table examining each bin to see if a bin is ready for transmission. As but one example, each bin of a bin table may have a bin count that changes over time. When a bin count reaches a predetermined value, data for the bin may be ready for transmission.

In one particular arrangement, bins may have different "time-out" settings. Thus, the contents of one bin may be packetized at a different rate than another.

As shown in FIG. 4, if a bin is ready for transmission, data for such a bin may be retrieved. Such data may include a list of channels for a bin. Each channel may then be checked to see of the channel is active and not-silent. For all channels that are both active and not silent, a descriptor list is created. A descriptor list may essentially form a link to data for all channels in a list. Such a link may enable channel data for a bin to be read out in the order indicated by the descriptor list.

Once a descriptor list is complete, a packetizer function may calculate particular packet parameters, including but not limited to length, channel count, and checksums. A resulting descriptor may then be added to a transmit queue. A transmit queue may be periodically accessed, by an interrupt as but one example, to determine a packet for transmission.

Once one bin has been queued, the above process may be repeated for a next ready bin.

Referring to FIG. 5B, various structures involved in a packetizer function 404 and transmit packet function 406. In particular, FIG. 5B shows a bin table 508, a descriptor corresponding to bin 0 510, a packet buffer 512, and a transmit queue 514. A bin table 508 may be a list of bins accessible at a location indicated by bin table pointer. In the particular bin table 508 of FIG. 5B, information for each bin includes a bin number, count value for the bin, a number of channels in a bin, and all channel identification values (CIDs) for a bin.

A descriptor for bin 0 510 may include various fields. In the particular example of FIG. 5B, descriptor 510 includes a "chain" field, which may define which descriptors are chained together for common transmission, a status field, which can indicate a status of a descriptor (e.g., if it is "owned" by a transmitting process). Such fields may be single bit fields. In addition, a descriptor 510 may include buffer length values, and buffer pointer values for channels in a descriptor 510. A buffer pointer value may point to channel data for transmission. A corresponding buffer length value may indicate how much data should be read from the pointer value location.

A packet buffer 512 was previously described in conjunction with FIG. 5A.

A transmit queue 514 may include a list of pointers to descriptors. As previously noted, a transmit queue may be accessed by a system when transmission is possible (e.g., in response to an interrupt). Thus, a transmit queue may be accessed in an asynchronous fashion to transmit data to an asynchronous system.

Arrow 516-0 shows an access to a bin table according to a bin table pointer. In the particular example of FIG. 5B, a bin table includes a sequential arrangement of bin data for bins 0 to z. By accessing bin table data, a number of channels (e.g., #CH-0) for a bin may be ascertained, as well as identification for each channel associated with a bin (e.g., CHANNEL IDs FOR BIN0). Of course, bin table 508 is but one example of a possible bin table.

Arrow 516-1 illustrates construction of a descriptor for a bin (BIN 0). A descriptor 516-1 may be formed from information taken from a bin table. Chain bits may be set according when more than one descriptor is needed to chain together all channels in a bin. As but one example, each descriptor may point to data for two channels. In such an arrangement the transmission of 3–4 channels may require two descriptors chained together, the transmission of 5–6 channels may require three descriptors chained together, etc.

Referring back to descriptor 510 in FIG. 5B, in one arrangement, a buffer length may be a predetermined value. A buffer pointer may point to a particular channel data location in packet buffer 512. In the example of FIG. 5B, a first buffer pointer (BUFFER POINTER 1) points to a first entry for a channel 0 (CH0 t0) (as shown by arrow 516-2) and a second buffer pointer (BUFFER POINTER 2) points to a first entry for a channel 1 (CH1 t0) (as shown by arrow 516-3). Of course, a given bin might not necessarily include consecutive channel numbers, and may include only one channel. Further, additional information for a packet may be included in a descriptor, such as packet size, checksum values, etc.

FIG. 5B also shows how a descriptor may be placed in a transmit queue 514 (arrow 516-4). As but one very particular example, the first address for a descriptor may be entered in a queue location. A transmitting processing (as will be described below) may then access a transmit queue when data is ready to be sent. A transmit queue 514 may thus include pointers to the start of descriptors.

Figure 5C:
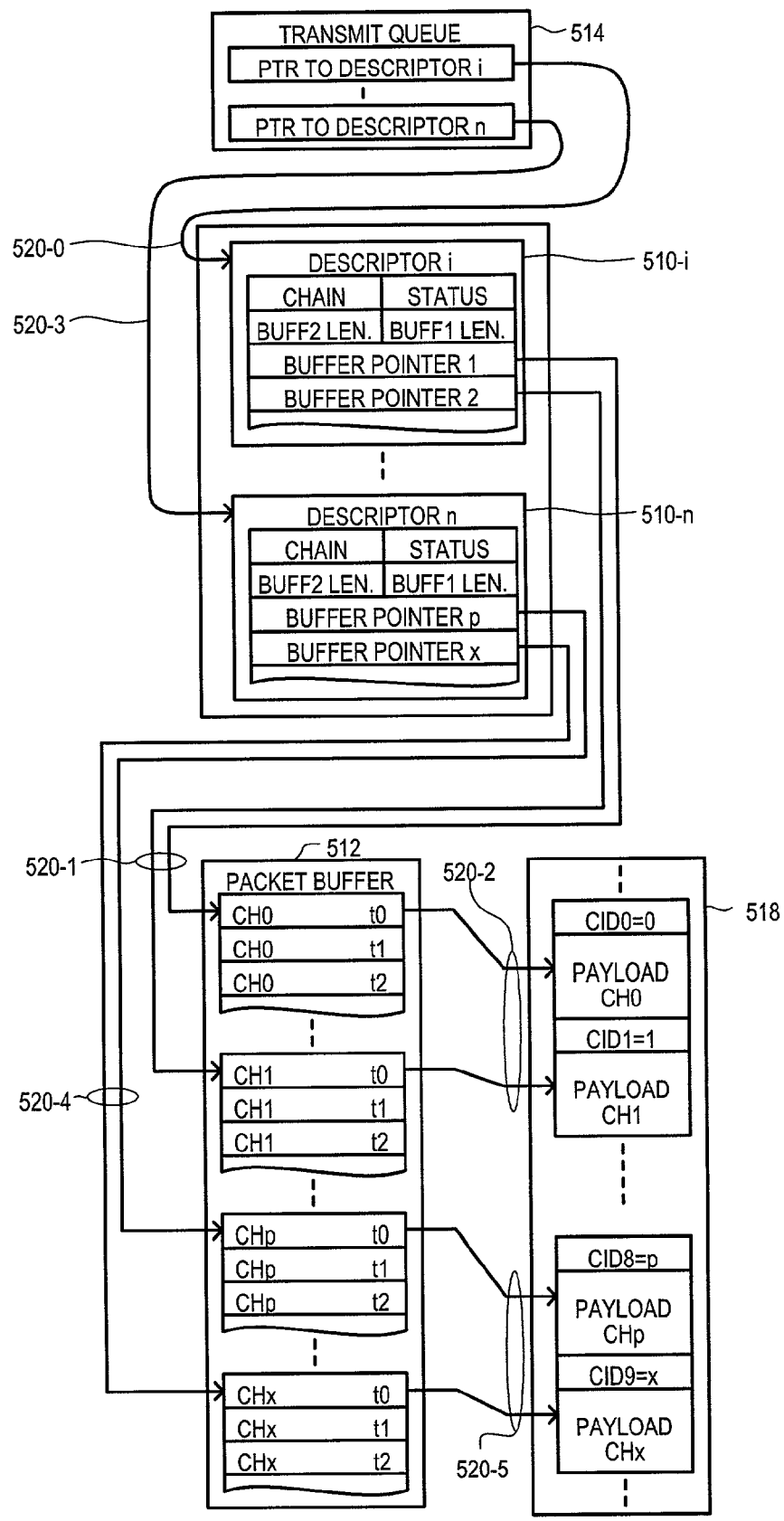

Referring now to FIGS. 4 and 5C, one example of a transmit packet function 406 will now be described. FIG. 5C is a diagrammatic representation of various steps of a transmit packet function 406.

As shown in FIG. 4, a transmit packet function 406 may check a transmit queue for data. As but one example, a process may read a "head" pointer for a transmit queue. If such a pointer has a predetermined value (e.g., a null value), a queue may be empty, and a transmit packet function 406 may end. If, however, a transmit queue is not empty, a transmit packet operation may take place.

If a transmit queue indicates that data is ready, a transmit function may transmit data represented by a queue. In the particular example of FIG. 4, such a function may include a direct memory access (DMA) read. Thus, current DMA operations may be stopped. A DMA engine may be given a starting location (i.e., a transmit head). In FIG. 4, such a starting location may be a first descriptor for a given bin. A DMA operation may then be started. Data for one or more descriptors may then be transmitted.

Referring again to FIG. 4, after a DMA operation has been started for a given transmit queue, a process may check to see of any more packets (e.g., data for a given bin) are ready for transmission. Such data may be placed in a transmit queue for transmission the next time a transmit packet function 406 is invoked. Otherwise, a "null" value may be placed at the start of a transmit queue to indicate that the transmit queue is empty.

One example of a transmit packet function 406 is shown in FIG. 5C. FIG. 5C includes previously described structures, including a transmit queue 514, descriptors (510-*i* and 510-*n*), and a packet buffer 512. In addition, FIG. 5C shows portions of resulting packet 518 that may be transmitted by a packet transmit function 406.

In FIG. 5C, a transmit queue 514 includes pointer to a series of descriptors, represented as a chain of descriptors beginning with a descriptor 510-*i* and ending with a descriptor 510-*n*. The packet buffer 512 of FIG. 5C shows information for a number of channels, including those for the chain of descriptors (510-*i* to 510-*n*). Packet 518 represents how payload data for multiple channels may be arranged in a packet in response to the shown chain of descriptors.

Various steps of a packet transmit function 406 are represented in FIG. 5C by arrows. Arrow 520-0 shows how a transmit process may access a location of a first descriptor (DESCRIPTOR i) by accessing a transmit queue 514. Arrows 520-1 show how descriptor information may be used to access channel locations in a packet buffer 512 (in this example, those for time t0). Arrows 520-2 show how packet buffer locations may be read as payloads for an outgoing packet.

FIG. 5C illustrates a case where multiple descriptors are chained together. Thus, a packet transmit function may write data for such chained descriptors. Arrow 520-3 shows how a last descriptor (DESCRIPTOR n) may be reached. Arrows 520-4 show how descriptor information may be used to access channel locations in a packet buffer 512 (as noted above, those for time t0). Arrows 520-5 show how packet buffer locations may be read as payloads for an outgoing packet.

In this way, multiple channel data may be arranged for transmission.

Figure 6B:
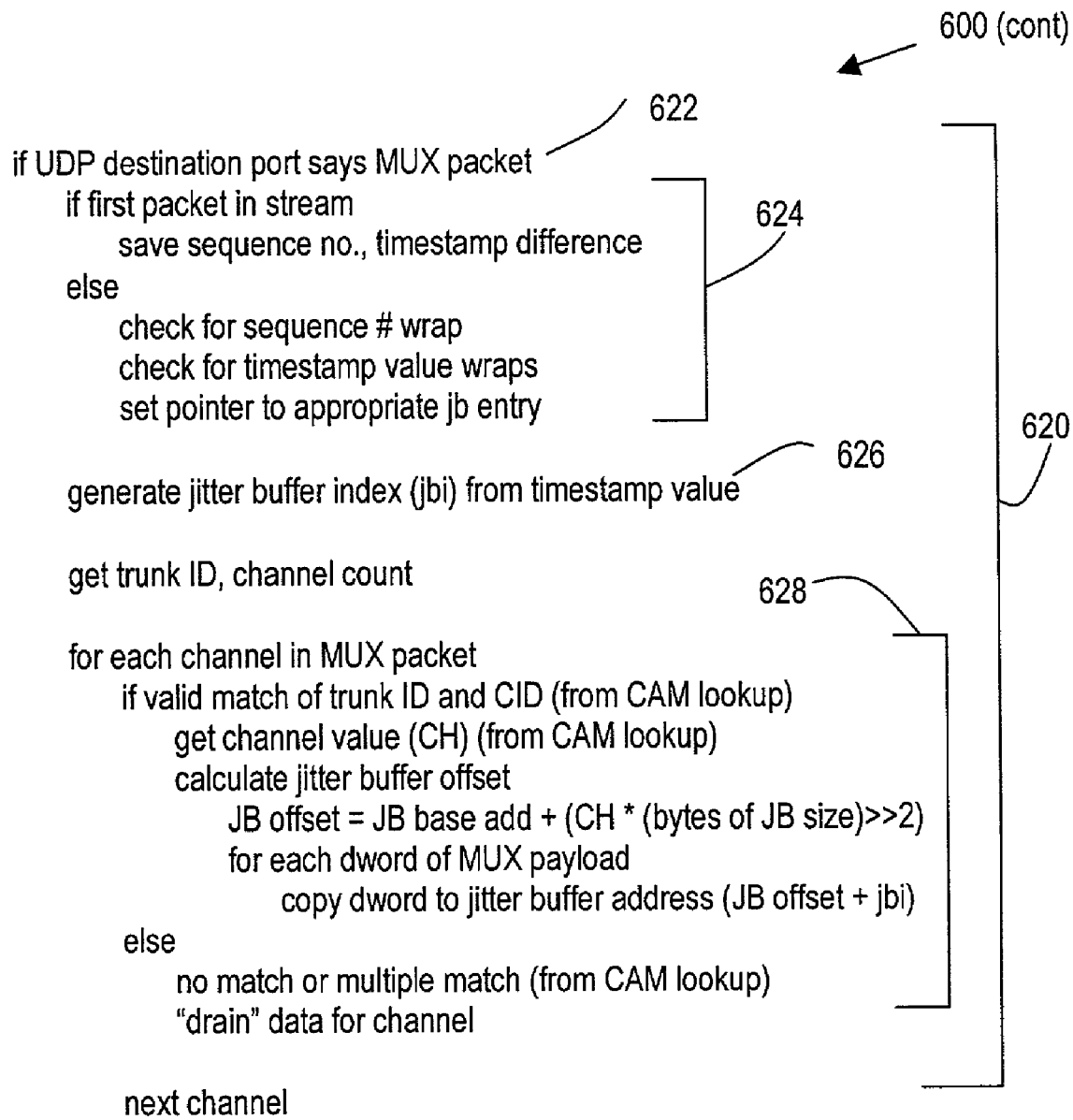
Figure 6C:
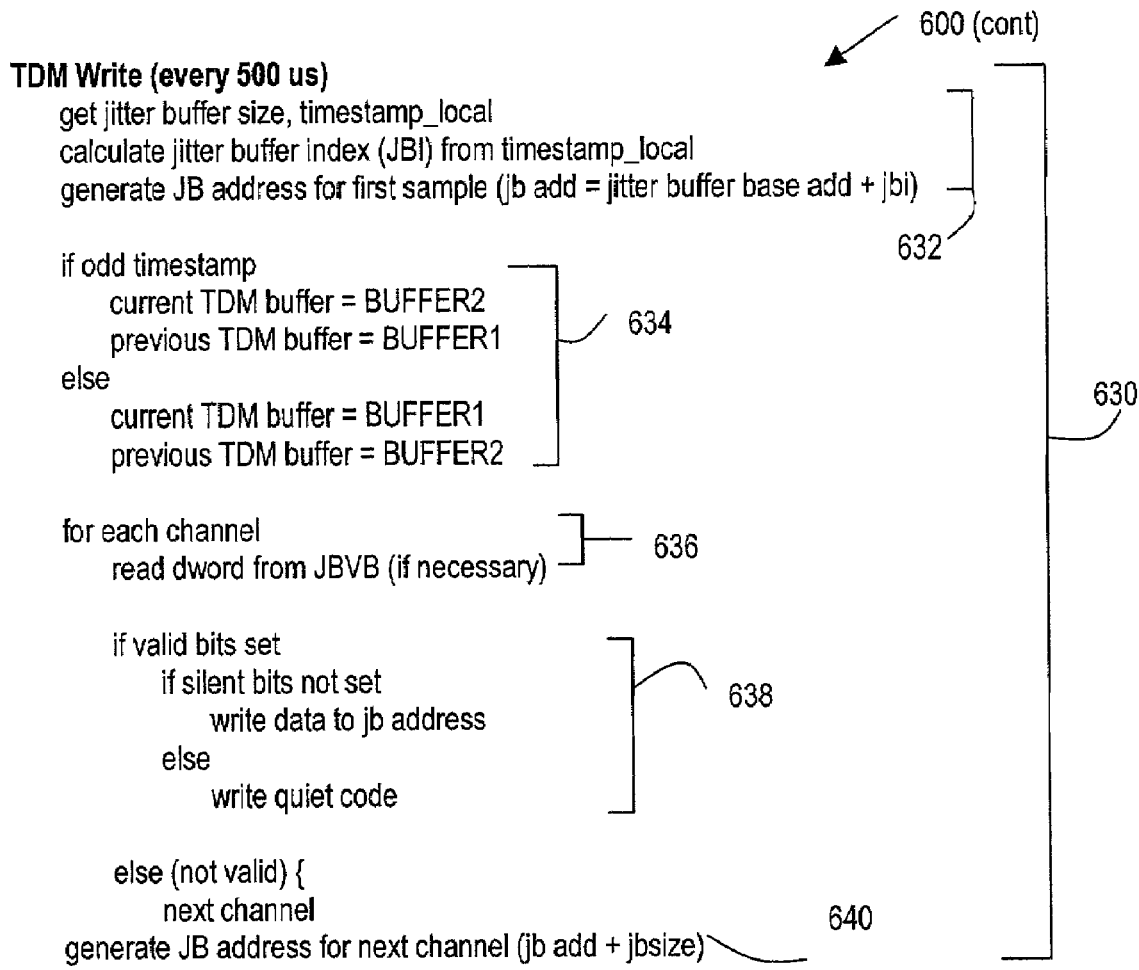

A third embodiment of an ingress path will now be described with reference to FIGS. 6A to 6C. FIGS. 6A to 6C may be portions of a single pseudocode example for an ingress path. Thus, it is understood that the pseudocode of FIG. 6C may follow that of 6B, which may follow that of 6A.

Referring now to FIG. 6A an ingress path may process packets of at least two types: "simplex" packets that may include a payload for a single channel; and multiplex (MUX) packets that may include payloads for multiple channels.

In the example of FIG. 6A, an ingress path may be assumed to process packets transmitted according to a predetermined protocol, in this case UDP. Thus, particular fields from such a packet may be read to ascertain whether a packet is simplex or multiplex. In FIG. 6A, an initial step includes reading a UDP destination port value, a sequence number, and a timestamp value. Such a step is shown in FIG. 6A as 602.

A UDP destination port may provide an initial indication. Accordingly, an ingress path may include a simplex flow and MUX flow. A simplex flow is shown as 604 in FIG. 6A. A MUX flow will be described with reference to FIG. 6B.

A simplex flow 604 may initially examine UDP destination port (604). If a UDP destination port has a predetermined value, the corresponding packet may be considered a simplex packet. Such a step is shown as 606 in FIG. 7A.

Figure 7A:
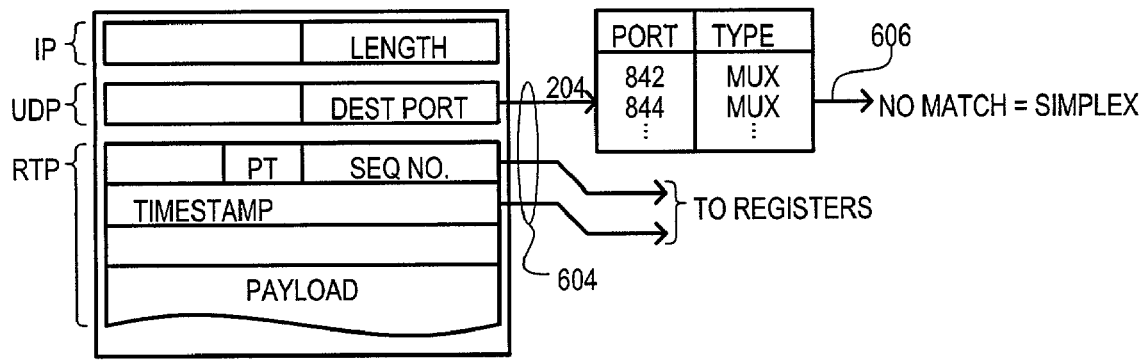
FIGS. 7A to 7C illustrate an ingress flow for a simplex packet according to one embodiment.

FIG. 7A shows an example of a packet that includes an IP header portion (IP), a UDP header portion (UDP), and an RTP portion (RTP). In the example of FIG. 7A, examining a UDP destination port may include checking a destination port value (in this case "204") to a predetermined list of known MUX port values. If there is no match, the packet is assumed to be simplex. The example of FIG. 7A shows step 606 yields no match, and thus the packet is assumed to be a simplex packet.

Once it has been determined that a simplex packet has been received, various packet features may be extracted and calculated. Such a step is shown as 608 in FIG. 6A, and specifically shows the steps of getting a packet length (which may be a field in a packet) and calculating a payload size. A payload size may enable a proper reading of payload data.

Figure 7B:
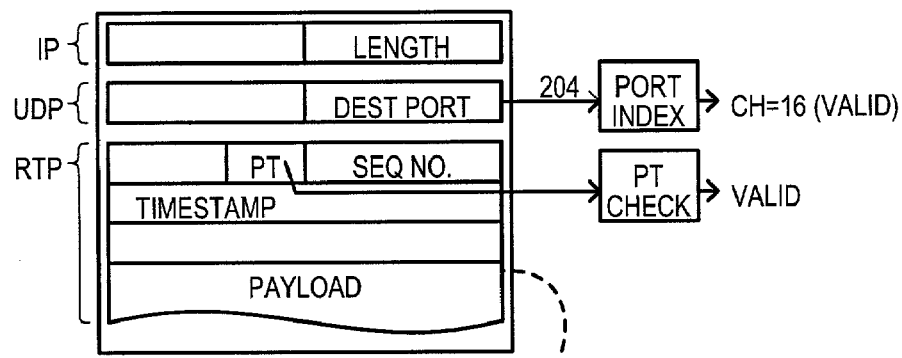

The embodiment of FIG. 6A also includes a number of checks to determine the validity of packet and/or its payload (610). Such steps are shown in FIG. 7B by a destination port value (204) being applied to some sort of index to yield a channel ID value (CID=16). If such a channel is valid, a payload type (PT) may then be checked. As shown in FIG. 7B, a payload type may be a predetermined field of an RTP portion of a packet. In FIG. 7B, it is assumed that both checks indicate a valid channel and valid payload type. As shown in FIG. 6A, if either check failed, the packet would be dropped (i.e., ingress path processing of the packet would cease).

If a packet channel and payload ID is valid, the packet payload can be considered suitable for writing into a jitter buffer. In the example of FIG. 6A, an ingress path 600 may continue by updating monitoring information (612). This may include incrementing values reflecting the number of packet received, the number octets received, and/or updating a sequence number, to name but a few examples.

An ingress path 600 may then generate an appropriate jitter buffer address for a payload of a simplex packet. Such an operation may include calculating a jitter buffer offset value and jitter buffer index value (614). One example of such a calculation is shown in FIG. 7C.

Figure 7C:
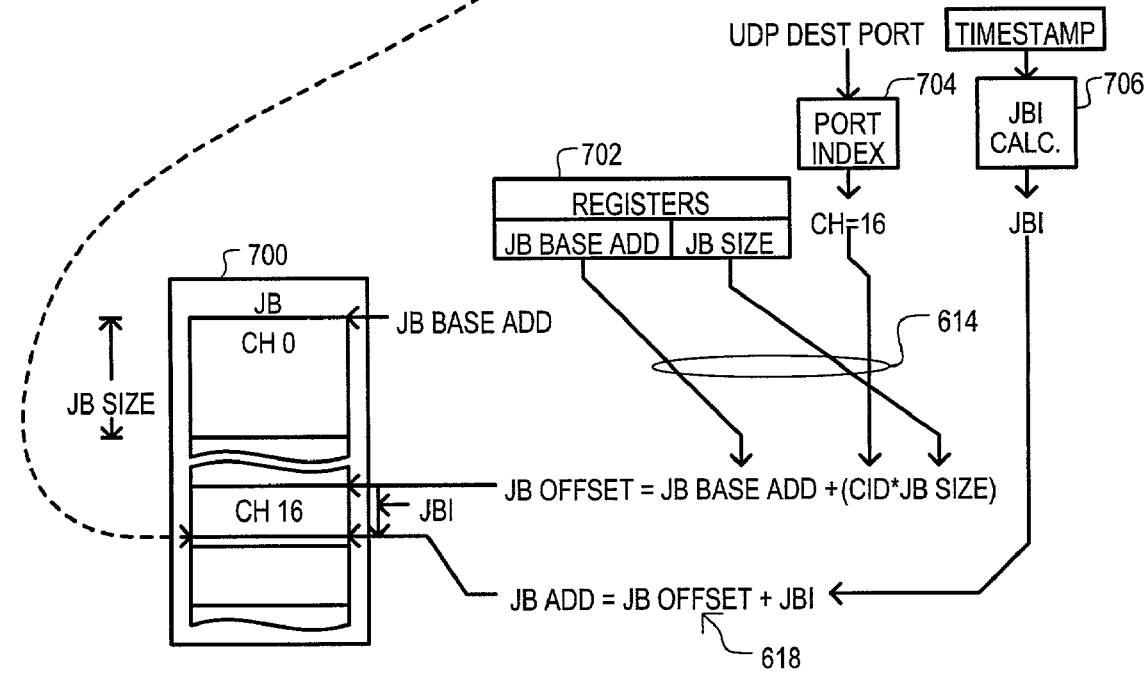

FIG. 7C shows a jitter buffer (JB) 700, registers 702, a port index 704, and a jitter buffer index (JBI) calculation. A JB 700 may include storage locations that begin at a base address (JB BASE ADD) and include a number of channel buffers, each having the same size (JB SIZE). Registers 702 may store the predetermined JB base address and JB size. A port index 704, as shown in FIG. 7C, may receive a destination port value and give a channel ID. As but one example, a port index 704 may include a content addressable memory, or the like that receives a UDP destination port value (or some manipulation thereof) and provides a channel ID as associated data. A JBI calculation 706 may generate a JBI value from a timestamp of a received packet. Such an operation may include shifting a timestamp value to access particular bits.

The generation of a JB offset value is represented in FIG. 7C as 614.

An ingress path 600 may further include setting a pointer to a jitter buffer entry according to various values (616). In particular, if a received packet is a first packet of a stream, a sequence number for the packet may be saved. In addition, a timestamp difference value may be calculated. Such a timestamp difference value may be the difference between a timestamp value at an ingress path end (tc), minus a timestamp value for the packet (ts). Such values may be used to position data for a subsequently received packet by taking into account "wraps" in a timestamp and/or sequence number. A pointer may then be generated that indicates which packet is the newest packet.

That is, JBI values of two different packets for the same channel may place the packets payload data in different positions of jitter buffer. However, without a sequence number, it cannot be determined which packet preceded the other. By saving a sequence and time difference value for a first packet, the position of a subsequent packet (in time) relative to the first packet can be determined.

A simplex payload may then be written to a jitter buffer location indicated by jitter buffer offset address and jitter buffer index (618). Such a step is shown in FIG. 7C as 618. It is noted that in a preferred embodiment, a JBI value may be the least significant bits of jitter buffer address.

As noted above, an ingress path 600 according to the embodiment of FIGS. 6A to 6C may process MUX packets as well. A MUX packet case will now be described with reference to FIG. 6B and FIGS. 8A to 8C.

FIG. 6B shows a MUX flow designated by the reference character 620. A MUX flow 620, like a simplex flow 604, may initially examine UDP destination port (622). Such a step is shown as 622 in FIG. 8A.

Figure 8A:
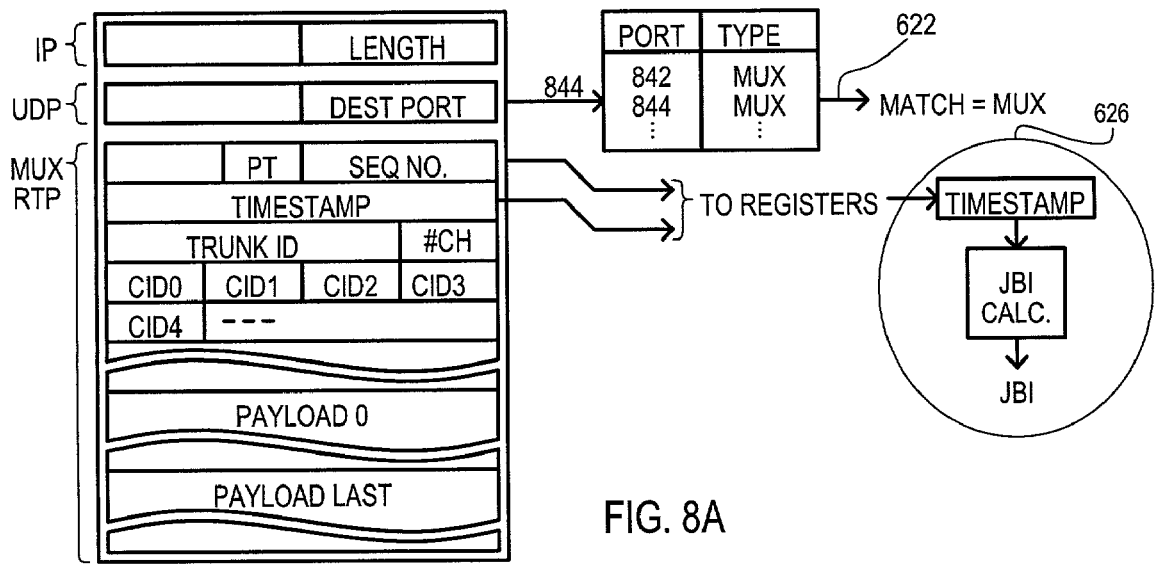
FIGS. 8A to 8C illustrate an ingress flow for a multiplex packet according to one embodiment.

FIG. 8A shows an example of a packet that includes an IP header portion (IP), a UDP header portion (UDP), and a MUX RTP portion (MUX RTP). In the example of FIG. 8A, examining a UDP destination port may include checking a destination port value (in this case "844") to a predetermined list of known MUX port values. If there is a match, the packet is assumed to be MUX. The example of FIG. 8A shows step 622 yield a match, and thus the packet is assumed to be a MUX packet.

A MUX flow 620 may then proceed with the step of setting a pointer to a jitter buffer entry according to various values (624). Such a step may proceed in the same general fashion as 616 in FIG. 6A.

Figure 8B:
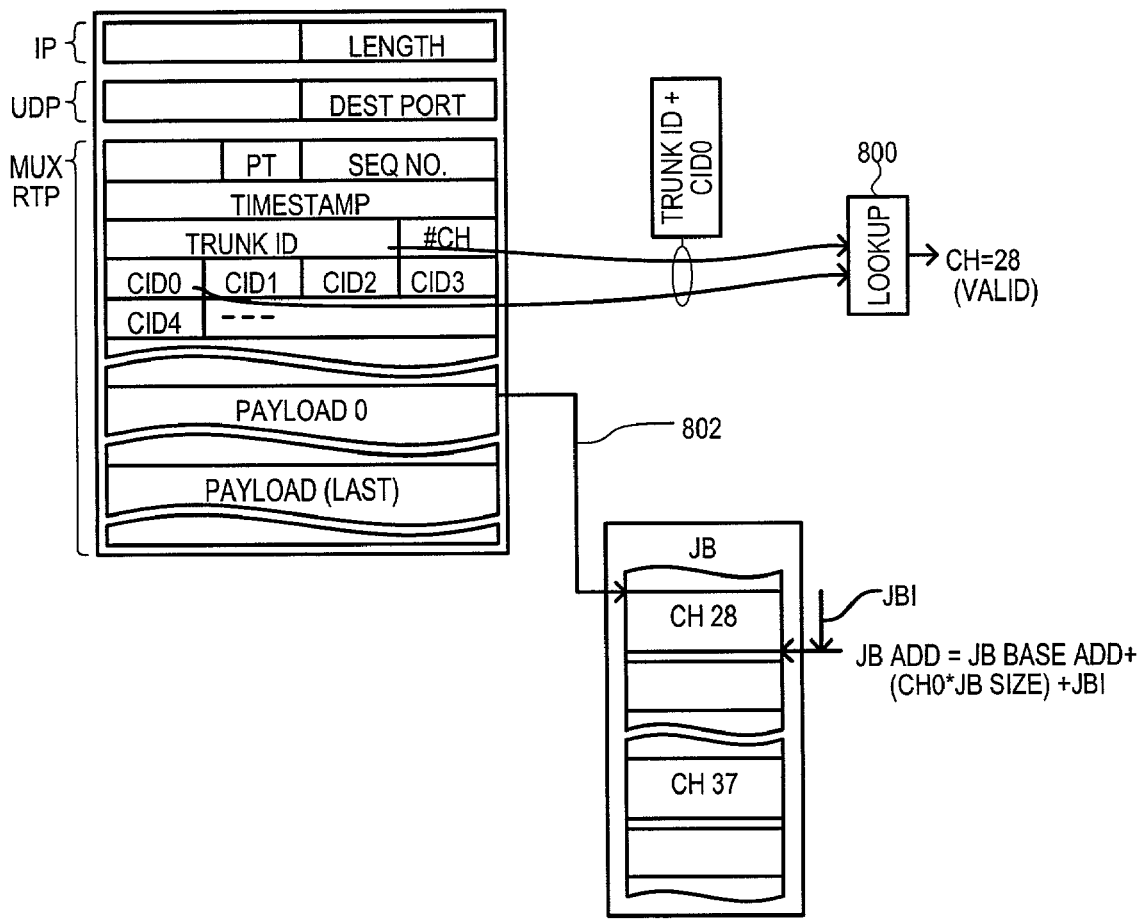

A MUX flow 620 may then extract particular MUX packet values for processing multiple channel payload data. In FIG. 6B, such a step includes getting a trunk ID value and channel count (#CH). As shown in FIG. 8B, such values may be predetermined fields in a MUX RTP portion of a packet.

A MUX flow 620 may then generate a jitter buffer index value (626). Such a step may be essentially the same as a JBI calculation in a simplex flow (604).

Figure 8C:
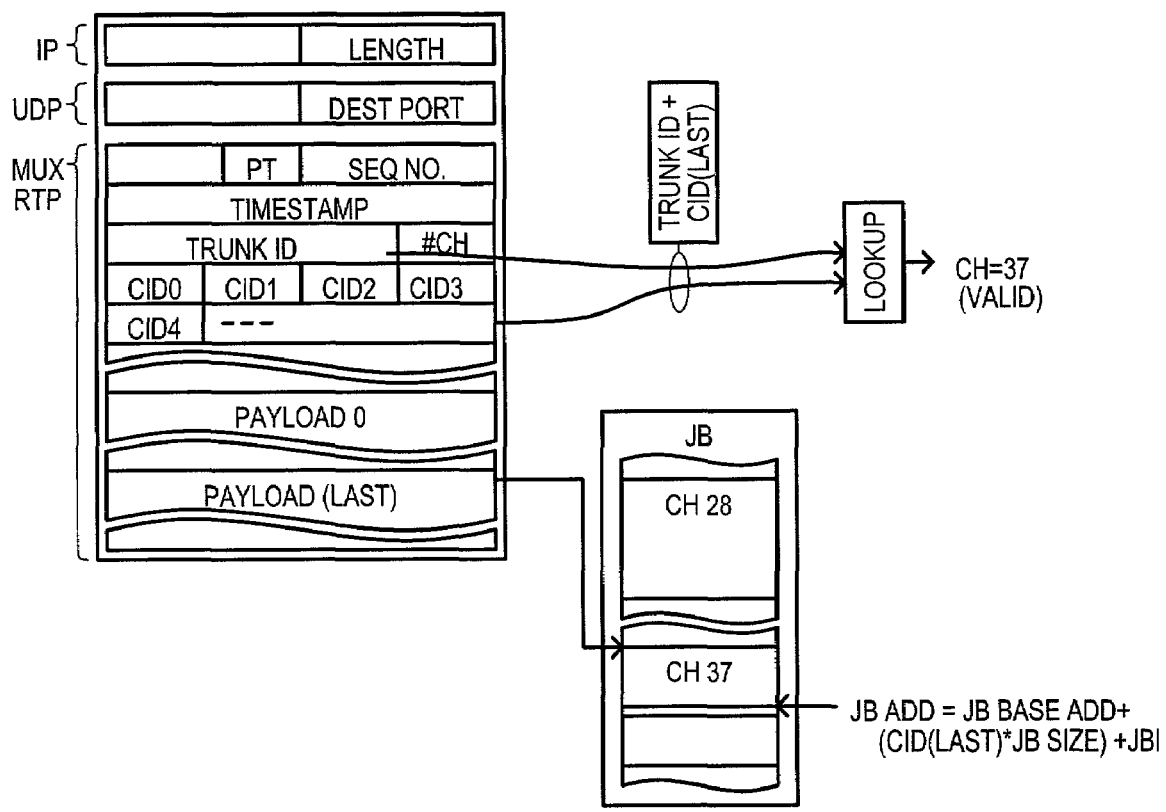

A MUX flow 620 may then process data on a channel-by-channel basis (628). In one embodiment this may include performing a lookup operation on a trunk ID value in combination with each channel ID value of a MUX packet. As shown in FIG. 6B, if such a lookup indicates a channel is valid, payload data for the channel may be written to a jitter buffer. Such a lookup operation for a first channel of a MUX packet is shown in FIG. 8B. A lookup for a last channel in a MUX packet is shown in FIG. 8C.

As shown in FIG. 8B, a MUX packet may include a number of channel ID values (CID0 to CID4, are shown). A lookup operation 800 may receive a first channel ID (CID0) with a TRUNK ID value and yield a channel ID value. In the example of FIG. 8B, such an operation value yields a channel number (CH) 28.

A CH value, along with a JB base address, JB size, and JBI value may then be used to generate a jitter buffer address. Payload data corresponding to the original CID channel may then be written to the jitter buffer address (arrow 802).

Such an operation may be repeated for all channels in a MUX packet (e.g., according to a #CH value). A last channel calculation is shown in FIG. 8C, and illustrates how a CH value indexes to a particular portion of a jitter buffer, while a JBI value provides an offset into such a portion.

Referring back to FIG. 6B, if a lookup indicates a channel is not valid, data for such a channel may be "drained" (e.g., a pointer to a corresponding payload may be automatically incremented to the next payload location).

FIG. 6C shows a TDM write function 630 that may be included in an ingress path 600. A TDM write function 630 may be invoked periodically. In the particular example of FIG. 6C the period is 500 microseconds. Of course, such a period may vary according to system and application.

A TDM write function 630 may write jitter buffer data to a buffer that may be accessible by a time division multiplex (TDM) type system.

A TDM write function 630 may include calculating a first jitter buffer address (632). In FIG. 6C, such a step may include retrieving a jitter buffer size value and local timestamp value (timestamp_local). It is noted that a timestamp_local value may be a timestamp_value associated with an ingress path, and not that associated with a received packet. A timestamp_local value may be used to generate a jitter buffer index (JBI). Such a step may be essentially the same as a JBI calculation in a simplex flow (604). A JBI value may then be combined with a jitter buffer base address value to generate a first jitter buffer address.

Figure 9A:
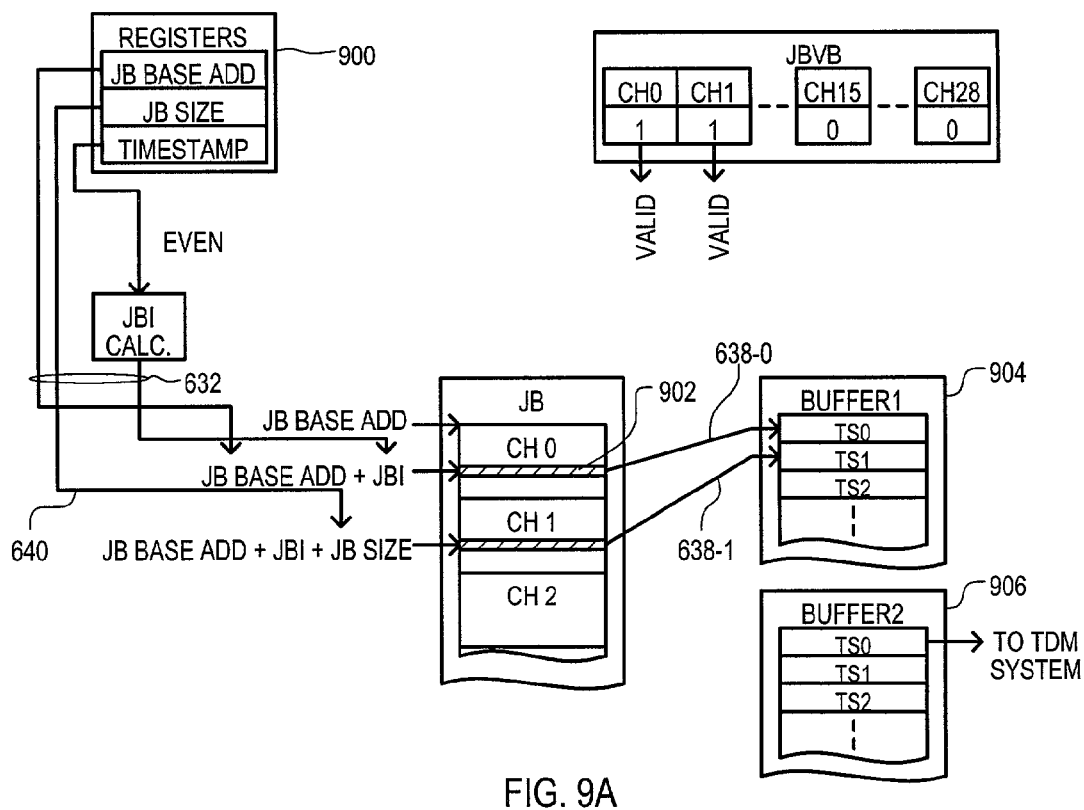
FIGS. 9A and 9B show a write to a synchronous system function according to an embodiment.

FIG. 9A shows one example of a jitter buffer address calculation step 632. A jitter buffer base address (JB BASE ADD) and timestamp value (TIMESTAMP) may be read from registers 900. A resulting address may index to a first jitter buffer location 902.

Once a first JB address is generated, one of multiple write buffers may be selected according to a timestamp value (634). In the particular case of FIG. 9A, if a timestamp is odd, a current write buffer is "BUFFER 2." However, if a timestamp is even, a current write buffer is "BUFFER 1." FIG. 9A shows BUFFER 1 as item 904 and BUFFER 2 as item 906. Such a multiple buffer arrangement may enable data to be read by a TDM system from one buffer while a TDM write function is writing data to another buffer.

A TDM write function 630 may then write data on a channel by channel basis. In particular, a TDM write function 630 may examine jitter buffer valid bits (JBVB) to determine if a channel is valid (636). JBVB bits may be read from a valid memory that provides an indication as to the validity of a jitter buffer valid data. A valid memory was discussed at length with reference to a second embodiment above.

In the case of voice data, additional steps may be executed. If a valid bit is set for a channel, the channel may further be examined to see if it is silent. If a channel is both valid and not silent, the jitter buffer data may be written to the selected buffer (638). An example of the writing of data for a first channel is shown in FIG. 9A as 638-0. It is assumed that a JBVB bit is valid and a channel is not silent, thus data at jitter buffer address JB BASE ADD+JBI has been written to a location in BUFFER1 904. A BUFFER1 904 location may correspond to a particular timeslot (TS0) of a TDM system.

As shown in FIG. 6C, once a first channel is processed, a jitter buffer address for a next channel may be generated. Such a step may include adding a jitter buffer size value to a jitter buffer address (640). Such a step is shown in FIG. 9A as 640. Processing may then occur as in the case for a first channel. If a JBVB indicates a channel is valid and not silent, jitter buffer data may be written to a next location in a buffer. An example of the writing of data for a second valid channel is shown in FIG. 9A as 638-1. Data at jitter buffer address JB BASE ADD+JBI+JB SIZE has been written to a location in BUFFER1 904. A BUFFER1 904 location may correspond to another particular timeslot (TS1) of a TDM system.

Figure 9B:
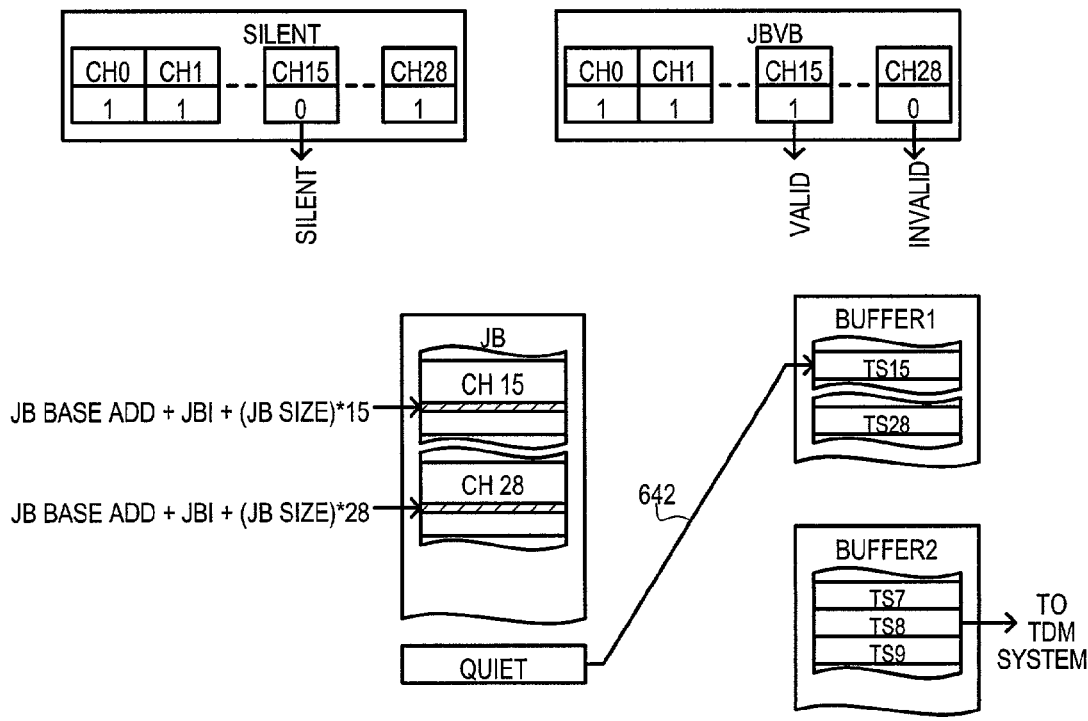

The particular TDM write function 630 of FIG. 6C also includes steps when a JBVB indicates a valid but silent channel, as well as an invalid channel. If a channel is valid but silent, a predetermined value may be written into a buffer location. In the example of FIG. 9B, such a value is shown as a "quiet" code (QUIET). A quiet code may be a predetermined data value stored in a system. Alternatively, a quiet code may be value generated by a digital signal processor (DSP), or the like, to produce a noise value that mimics a background noise for a channel. In an alternative approach, a quiet code may be written when activity for a channel falls below a predetermined threshold, rather than according to a silent code. A writing of quiet code to channel is shown as 642 in FIG. 9B. It is noted that, a SILENT bit and JBVB bit indicate that channel 15 is valid, but silent. Consequently, a quite code is written.

FIG. 9B also shows an invalid channel. A JBVB bit for channel 28 indicates that the channel is not valid. As a result, such a channel may be skipped.

Figure 10B:
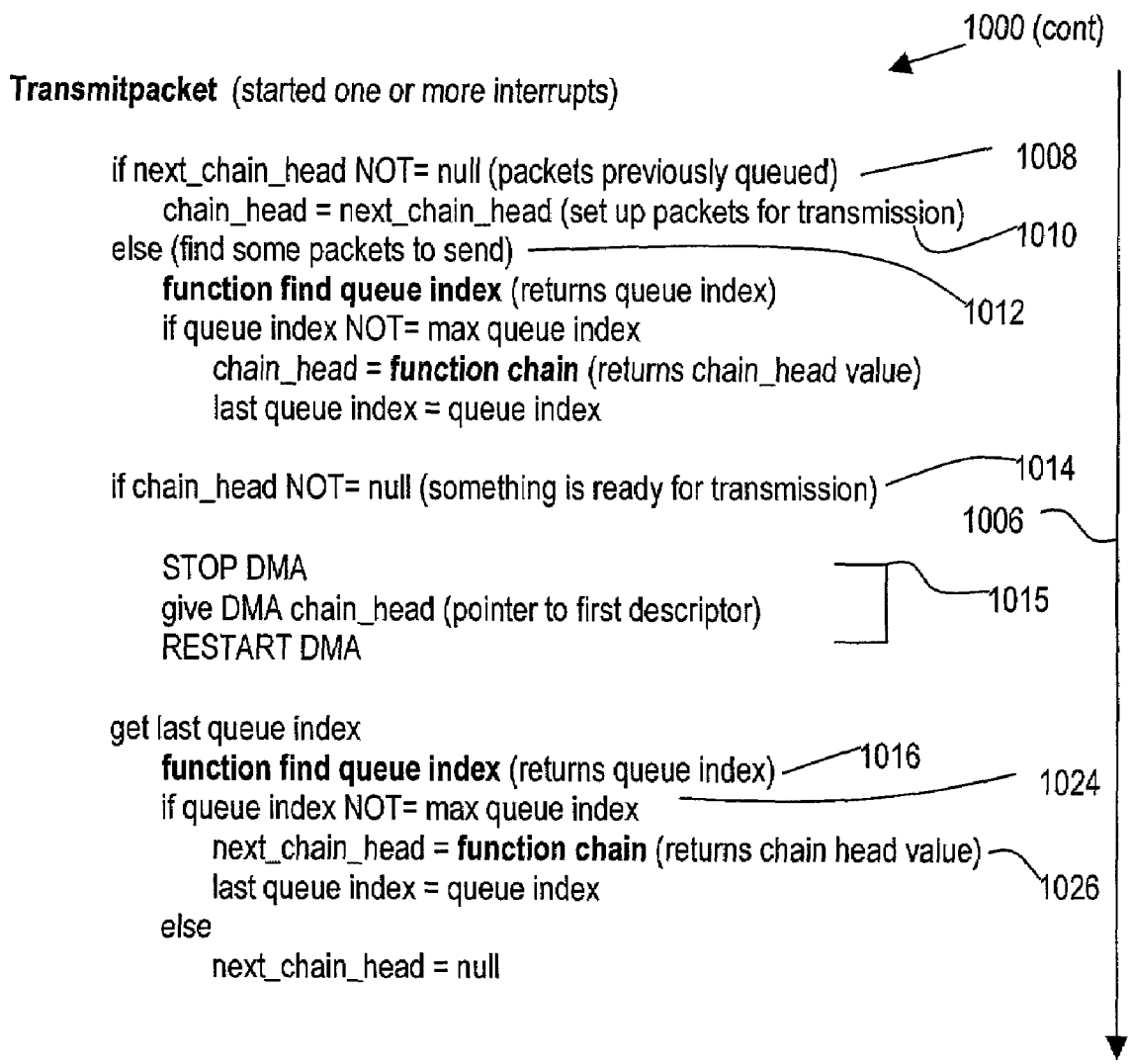

A third embodiment of an egress path will now be described with reference to FIGS. 10A to 10C. FIGS. 10A to 10C may be portions of a single pseudocode example for an egress path. Thus, it is understood that the pseudocode of FIG. 10C may follow that of 10B, which may follow that of 10A.

A third embodiment egress path shown by the general reference character 1000, and may include TDM read function 1002, a packetizer function 1004, and a transmit packet function 1006. A TDM read function 1002 may be invoked periodically. In the particular example of FIG. 10A the period is 500 microseconds. Of course, such a period may vary according to system and application.

A TDM read function 1002 essentially follows the format of a read from synchronous system function, shown as item 402 in FIG. 4. That is, a time stamp value may be read from a register. Such a timestamp value may be used to generate a packet buffer offset value. For each channel, a destination address may be generated from a buffer base address, buffer size and offset value. As but one example, such values may be added. Data may then be written from a TDM buffer (corresponding to a particular channel) to a packet buffer.

A packetizer function 1004 may also be invoked periodically. In the particular example of FIG. 10A the period is 1000 microseconds. Of course, such a period may vary according to system and application.

A packetizer function 1004 may essentially follow the format of the packetizer function shown as item 404 in FIG. 4. A packetizer function 1004 may differ from that of FIG. 4 in that more specific steps are described related to particular protocols. In particular, a timestamp value may be retrieved. Such a timestamp value may then be inserted into a packet header field (e.g., an RTP or MUX RTP field).

A packetizer function 1004 may then access a bin table. The various bin tables may then be examined to see if any have "timed out." In the example of FIG. 10A, timing out includes a bin count that is zero. For "timed out" bins, a sample size value and number of channels value are retrieved. A sample size value may affect overall packet size and a number of channels value can determine how many channels are examined.

Unlike the packetizer function of FIG. 4, the function 1004 of FIG. 10A may include getting pointers to a header buffer. Such pointers may enable packet header information to be updated in response to channel information. As but one example, header pointers may point to an IP header template that includes a total length field. In addition or alternatively, a header pointer may point to a UDP header template that includes UDP length and UDP checksum fields.

A packetizer function 1004 may continue by examining each channel in a timed out bin to see if it is both valid and non-silent. A descriptor list may then be created for all such channels. Descriptor lists were described in detail with reference to FIG. 4.

A packetizer function 1004 may then calculate various parameter data values for a packet, based on new channel information. Such parameters may include a total length value and a UDP length value. The calculation of such values follows from the illustrations shown in FIGS. 5A–5C.

According to the number of valid and non-silent channels, a number of channels value may be updated for inclusion in a MUX RTP field.

Because a number of channels value (#CH) may be included in a UDP payload, a UDP checksum value may be updated. Such a value may then be updated in a header template. A bin descriptor for a sequence of channels may then be appended to a transmit queue.

A transmit packet function 1006 may be invoked in an asynchronous fashion. In the particular example of FIG. 10B, a transmit packet function may be invoked in response to an interrupt generated by a system.

The transmit packet function 1006 of FIG. 10B, essentially follows the format of the transmit packet function shown as item 406 in FIG. 4. A transmit packet function 1006 may differ from that of FIG. 4 in that more specific transmission steps are described.

The various steps of a transmit packet function 1006 will now be described in more detail.

Referring to FIG. 10B, it is assumed that an interrupt is generated resulting in the transmit packet function 1006 being initiated. A transmit packet function 1006 may check to see if there are previously queued packets (e.g., one or more descriptors that are ready for transmission). In the particular example of FIG. 10B this may include checking to see of a next_chain_head value is not null (step 1008).

If a next chain head value is not "null," a chain_head value may be set to a next_chain_head value (step 1010). In this way, if a packet was previously ready for transmission, a transmit chain head may be advanced to point to the packet. If a next_chain_head is not null, a transmit packet function may proceed to collect packets (if any are available) (step 1012). Such a procedure will be described at a later point herein.

As shown in FIG. 10B, a transmit packet function 1006 may then check a chain_head value to see if it is not null (step 1014). If a chain_head value is not "null," this can indicate that transmission is ready based on one or more descriptors. With data ready for transmission, a transmit packet function may transmit indicated data in a buffer (steps 1015). In the example of FIG. 10B, such a step may include ensuring a DMA process is stopped, giving a DMA process a chain head value, and then restarting the DMA process.

Referring back again to FIG. 10B, following a transmission of data (steps 1015) a transmit packet function 1006 may queue up any more descriptors that may be ready for transmission. In the particular example of FIG. 10B, such a step may include invoking a find queue index function 1016.

One example of a find queue index function is shown in FIG. 10C, and illustrated by the reference character 1016. As shown in FIG. 10C, a find queue index function 1016 may set a queue index value to a last queue index value (step 1018).

A find queue index function 1016 may then check to see of a queue index is a max queue index (which may represent that a transmit queue is empty or at a last entry). In such a case a queue index may be set to 0.

If a max queue index value has not been reached, a queue index for packets that are ready for transmission may be returned. Accordingly, a find queue index function 1016 may check a transmit queue for any more data that is ready for transmission (steps 1020). In particular, a transmit queue index entry can be checked to see if it points to a particular single descriptor case. In FIG. 10C a single descriptor case has been reserved for local processor (LP) packets. If a transmit queue entry indicates a local processor case and there is data to send (i.e., the LP packet pointer is not zero), a queue index may be returned. If an LP packet case is not indicated, as long as a queue head does not equal a queue tail (e.g., a transmit queue is not empty), a queue index may be returned.

Referring back to FIG. 10B, it will be recalled that a transmit packet function 1006 may invoke a find queue index function 1016 that returns a queue index value. Upon receiving a queue index, a transmit packet function 1006 may check to see if a queue index is a max queue index (step 1024). This may indicate that a transmit queue is empty, and no data is ready for transmission. However, if a queue index is not a max queue index, a chain function may be invoked (step 1026). A chain function may return a value that can be assigned as a chain head value.

One example of a chain function is shown in FIG. 10C, and illustrated by the reference character 1026. A chain function 1026 according to FIG. 10C, may take into account particular packets that may be guaranteed to be non-multiplexed. As but one example, such packets may be sent by a local processor (LP) in a system, as noted above. Such packets may not include multiplex data (e.g., some sort of partition in a payload) and so may be defined by a single descriptor. Accordingly, a chain function 1026 may check a queue index to see if the corresponding queue entry references such single descriptor case (step 1028).

Various methods may be used to distinguish single descriptor cases from possible multiple descriptor cases. As but two of the many possible examples, a single descriptor case may be indicated by a flag or predetermined address ranges.

If a queue index indicates a single descriptor case, a chain head and chain tail can be set to the single descriptor (step 1030). Once a chain function 1026 sets chain head and tail values for a single descriptor (1030), a chain head value may be returned (1032).

As will be recalled, in FIG. 10B a chain head value can be returned by a chain function (step 1026). In this way, a transmit packet function 1006 may transmit data for one queue entry and then set pointers to a next queue entry.

It is understood that upon receiving a next interrupt, a transmit packet function 1006 will transmit from a chain head (1110) to a chain tail (1112), which in this case is data indicated by a single descriptor (DESCRIP 10-0).

Having described a chain function for a single descriptor case, a multiple descriptor case will now be described.

Referring once again to chain function 1026 of FIG. 10C, if a queue index does not indicate a single packet case (e.g., not an LP packet), a chain function 1026 can chain descriptors together for transmission (steps 1034). In the particular case of FIG. 10C, descriptors may be continually chained together as long as a chain limit is not met and a buffer limit is not met. More particularly, if a descriptor is a first descriptor, a chain head may be set to a pointer to a packet head descriptor. A chain tail may then be set to a packet tail descriptor. However, for each subsequent descriptor, a chain bit may be set in the descriptor. In addition, a particular chain_tail buffer pointer (buffer 2 ptr) and chain_tail may be set to a subsequent descriptor. When a chain limit or buffer limit is reached, a last descriptor indication may be set for the last descriptor (step 1036).

A chain function 1026 may end by returning a pointer to a resulting chain head (step 1032).

The present invention, while applicable to various systems, may be particularly suitable for voice over packet applications. More particularly, an ingress path according to the present invention may serve and a conduit between a system that provides voice data in an essentially asynchronous fashion (e.g., a connectionless or connection oriented network) and a system that provides voice data in an essentially synchronous fashion (e.g., a TDM network). In addition, or alternatively, an egress path according to the present invention may be serve and a conduit between a system that provides voice data in an essentially synchronous fashion (e.g., a TDM network) and a system that provides voice data in an asynchronous fashion (e.g., a connectionless or connection oriented network).

However, it is understood that while various embodiments have been described in detail, the present invention could be subject to various changes, substitutions, and alterations without departing from the spirit and scope of the invention. Accordingly, the present invention is intended to be limited only as defined by the appended claims.

What is claimed is:

1. A method for transmitting data between two systems, comprising the steps of:
    reading a time indication including reading a timestamp value from a predetermined field from received data packets that include a plurality of data samples each assigned to different predetermined channel;
    checking a status value of each predetermined channel of the received data packet;
    if the status value of the predetermined channel is active, generating a jitter buffer address from a jitter buffer size, the predetermined channel, and the time indication, calculating a jitter buffer offset value by multiplying the channel by a jitter buffer size and
    copying the data sample of the predetermined channel from the received packet to the generated jitter buffer address; and
    periodically reading a plurality of data samples from the jitter buffer corresponding to a predetermined sequence of channels and writing said plurality of data samples to at least one synchronous buffer wherein the jitter buffer is a circular buffer.

2. The method of claim 1, wherein:
    checking the status value of each predetermined channel of the received data packet includes looking up a channel value in a valid index according to a channel identification value for each sample in the received packet and a trunk identification value common to each sample in the received packet.

3. The method of claim 1, wherein:
    generating the jitter buffer address for the active predetermined channel further includes combining the jitter buffer offset address with at least a portion of the timestamp value and wherein
    periodically reading the plurality of data samples from the jitter buffer includes reading a first channel value at a first address, and incrementing the address by the same amount to arrive at each sample in the sequence.

4. The method of claim 1, wherein:
periodically reading the plurality of data samples from the jitter buffer includes reading the sequence to one synchronous buffer on even time stamp values and to another synchronous buffer on odd time stamp values.

5. The method of claim 1, further including:
the received data packets include simplex packets having a data sample assigned to a single predetermined channel and multiplex packets that include the data samples assigned to different predetermined channels;
checking a predetermined field of the received packets for a multiplex indication;
if the predetermined field does not include a multiplex indication;
checking a status value of the predetermined channel of the received data packet;
if the status value of the predetermined channel is active, generating a jitter buffer address from a jitter buffer size, the predetermined channel, and the time indication, and
copying the data sample of the predetermined channel from the received packet to the generated jitter buffer address.

6. A method for transmitting data between two systems, comprising the steps of:
receiving data from a first system that includes a plurality of data samples each assigned to a channel value corresponding to a predetermined time slot;
reading a time indication associated with a first system;
generating an offset value from the time indication;
periodically, for each channel
generating a packet buffer address from at least a buffer size value and the offset value, and
for a valid data sample, writing the data assigned to the predetermined time slot to the packet buffer address;
checking the status of a plurality of bins that each include a number of channel values;
if a bin has a ready status
organizing the data samples corresponding to the channel values of the bin into a sequential order, and
reading the data samples for the channels of a bin according to the sequential order.

7. The method of claim 6, wherein:
receiving data from a first system includes receiving data from a time division multiplex system at a synchronous buffer that includes a plurality of sequential addresses, each corresponding to a predetermined time slot.

8. The method of claim 6, wherein:
checking the status of the plurality of bins includes determining if a predetermined amounts of time has passed since data for the bins was transmitted, the predetermined amount of time for one bin being different from that of at least one other bin.

9. The method of claim 6, wherein:
generating a packet buffer address includes generating a first packet buffer address from at least the offset and generating subsequent packet buffer addresses by adding buffer size value to the previous packet address.

10. The method of claim 6, wherein:
organizing the data samples corresponding to the channel values of the bin includes generating at least one descriptor that includes a pointer to the addresses of the data samples corresponding to the channel values of the bin.

11. The system of claim 10, wherein:
each descriptor includes pointers to a predetermined number of data samples; and
organizing the data samples further includes chaining a plurality of descriptors when the number of channels in a bin exceeds the predetermined number of data values for one descriptor.

12. The system of claim 10, wherein:
reading the data samples for the channels of a bin includes interrupting a direct memory access process and providing a first descriptor to the direct memory access process.

13. The system of claim 10, wherein:
organizing the data samples further includes forming at least one queue entry that includes a pointer to a first descriptor of at least one group of descriptors.

14. The system of claim 13, wherein:
organizing the data samples further includes forming at least one queue index that includes a pointer to at least one queue entry.

15. A method of transmitting multiple channel data between an asynchronous system and a synchronous system, comprising the steps of:
a) upon receiving a packet of data from the asynchronous system
determining if the packet of data includes data samples for multiple channels,
if a packet includes data samples for multiple channels determining a channel value for each data sample, and
if the channel value is valid, storing the data sample for the channel according to at least the channel value and a time indication associated with the packet of data;
b) periodically checking status values for a sequence of channels, and if a status value for a channel is valid, writing the stored data sample for the channel to at least one buffer according to at least the channel value;
c) periodically storing out-going channel data samples from the synchronous system according to at least a local time indication;
d) periodically checking the status of bins that represent collections of channels for out-going channels, and for bins having a ready status, queuing out-going channel data for the bin according to channel status information; and
e) periodically transmitting queued out-going channel data.

16. The method of claim 15, wherein:
the step a) further includes
if a packet does not include data samples for multiple channels
determining the channel value for a single data sample, and
if the channel value is valid, storing the data sample for the channel according to the channel value and a time indication associated with the packet of data.

17. The method of claim 15, wherein:
the step b) further includes if a status value for a channel is not valid, writing replacement data for the channel to the buffer according to at least the channel value.

18. The method of claim 15, wherein:
the step b) further includes writing the stored data sample for the channel to one of a plurality of buffers according to time indication associated with the received packet.

19. The method of claim 15, wherein:
in step a), storing the data samples for the channel according to at least the channel value includes generating a memory address from the channel value, a buffer size value, and at least a portion of the time indication associated with the received packet.

20. The system of claim 15, wherein:
in step b), writing the stored data sample for the channel to at least one buffer includes generating a memory address from a base address, a buffer size value, and at least a portion of the local time indication.

21. The method of claim 15, wherein:
in step d) at least two bins reach the ready status at differing rates.

22. The method of claim 15, wherein:
step d) forming at least one list that includes a sequence of entries for accessing out-going channel data.

23. The method of claim 22, wherein:
step d) the at least one list includes a list of descriptors that indicate locations where out-going channel data are stored.

24. The method of claim 22, wherein:
step d) the at least one list includes a queue index that defines the extent of at least one queue entry, the at least one queue entry indicating the locations where out-going channel data are stored.

25. The method of claim 22, wherein:
step d) the at least one list includes a plurality of queue entries, each queue entry indicating the locations where out-going channel data are stored for a common destination location.

* * * * *